United States Patent [19]
Kobayashi et al.

[11] Patent Number: 5,363,367
[45] Date of Patent: Nov. 8, 1994

[54] DATA TRANSMISSION SYSTEM USING AN OPTICAL FIBER LOOP

[75] Inventors: Isao Kobayashi; Hirotaka Kumata, both of Saitama, Japan

[73] Assignee: Honda Giken Kogyo Kabushiki Kaisha, Tokyo, Japan

[21] Appl. No.: 937,397

[22] Filed: Aug. 31, 1992

[30] Foreign Application Priority Data

Sep. 19, 1991 [JP] Japan .................. 3-266912
Sep. 19, 1991 [JP] Japan .................. 3-266913
Sep. 19, 1991 [JP] Japan .................. 3-266915

[51] Int. Cl.$^5$ .................. H04L 1/16; H04J 3/16
[52] U.S. Cl. .................. 370/16; 370/82; 370/94.1; 371/33
[58] Field of Search ............... 370/16, 16.1, 85.5, 370/85.15, 94.1, 94.2, 82; 340/825.05; 371/32, 33

[56] References Cited

U.S. PATENT DOCUMENTS

| | | | |
|---|---|---|---|
| 3,713,096 | 1/1973 | Comfort et al. | 340/172.5 |
| 4,002,842 | 1/1977 | Meyr et al. | 179/15 AL |
| 4,004,275 | 1/1977 | Arndt et al. | 370/85.15 |
| 4,320,388 | 3/1982 | McCarthy et al. | 340/825.54 |
| 4,612,541 | 9/1986 | Ohnishi | 340/825.05 |
| 4,680,757 | 7/1987 | Murakami et al. | 370/89 |

(List continued on next page.)

FOREIGN PATENT DOCUMENTS

| | | |
|---|---|---|
| 0044685 | 1/1982 | European Pat. Off. . |
| 0300778 | 1/1989 | European Pat. Off. . |
| 1801999 | 6/1970 | Germany . |
| 2333968 | 1/1975 | Germany . |
| 2445419 | 4/1976 | Germany . |
| 2905757 | 9/1980 | Germany . |
| 3007958 | 9/1981 | Germany . |
| 3422363 | 12/1984 | Germany . |
| 3622824 | 1/1988 | Germany . |

(List continued on next page.)

OTHER PUBLICATIONS

"Data Transmission System" by K. Konishi, Kokai No. 54-104205, Aug. 16, 1979; Jap. Appl. No. 53-10582.
"Data Transmitting Device" by Y. Bandou, No. 56-115059(A), Oct. 9, 1981; Jap. Appl. 55-17769.
"Loop Type Packet Communication System" by H. Nakamura, 57-69954(A), Apr. 30, 1982; Jap. Appl. 55-147280.
"Architecture and Design of a Reliable Token-Rig Network" by W. Bux et al., IEEE Journal (etc.), vol. SAC-1, No. 5, Nov. 1983, pp. 756-765.
"Hot Pluggable Modular Optical Multistation Access Unit" by F. Geller et al., IBM TDB, vol. 34, No. 3, Aug. 1991, pp. 344-345.

(List continued on next page.)

*Primary Examiner*—Wellington Chin
*Attorney, Agent, or Firm*—Pollock, VandeSande and Priddy

[57] ABSTRACT

A data transmission system comprising a plurality of data processing units connected to each other by optical fiber. Each data processing unit comprises optical/electrical converter means for converting an optical signal from the preceding data processing unit through the optical fiber to an electrical signal, electrical/optical converter means for converting an electrical signal to be sent to the succeeding data processing unit to an optical signal, a data receiving unit for receiving the converted electrical signal, means for determining whether or not the received signal was sent from the local data processing means, and gate means connected between the optical/electrical converter means and the electrical/optical converter means, the gate means being closed when the local data processing means performs data transmission and opened for alternative data receiving/passing.

12 Claims, 18 Drawing Sheets

U.S. PATENT DOCUMENTS

| | | | |
|---|---|---|---|
| 4,723,208 | 2/1988 | Chadima et al. | 364/200 |
| 4,727,601 | 2/1988 | Konishi | 455/612 |
| 4,910,050 | 3/1990 | Shimizu et al. | 340/825.5 |
| 5,025,142 | 6/1991 | Aoshima et al. | 250/201.9 |
| 5,228,027 | 7/1993 | Yamaguchi | 370/85.15 |
| 5,283,781 | 2/1994 | Buda et al. | 370/85.15 |

FOREIGN PATENT DOCUMENTS

| | | |
|---|---|---|
| 3840570 | 6/1989 | Germany . |
| 3806493 | 9/1989 | Germany . |
| 1626433 | 2/1991 | U.S.S.R. . |
| 1640706 | 4/1991 | U.S.S.R. . |
| 8300412 | 2/1983 | WIPO . |

OTHER PUBLICATIONS

"IC-Satz Fur Die Serielle Datenubertragung Auf LWL" By W. Blaesner, Design & Elektronik, Jun. 27, 1989, pp. 129–130, 132–133.

"LWL-Faserschalter" by H-P Siebert, Elektronik Mar. 5.2 1988 pp. 113—116.

"Systeme Informatique Repaarti Autour D'Un Bus Optione", by G. Aaron et al., Acta Electronica 24, I, 1981–1982, pp. 53–65.

"Lokale Rechnernetze als Ringsysteme" by B. Lindemann, Nachrichtentech, Elektron, Berlin 35, 1985, pp. 346–350.

FIG. 2
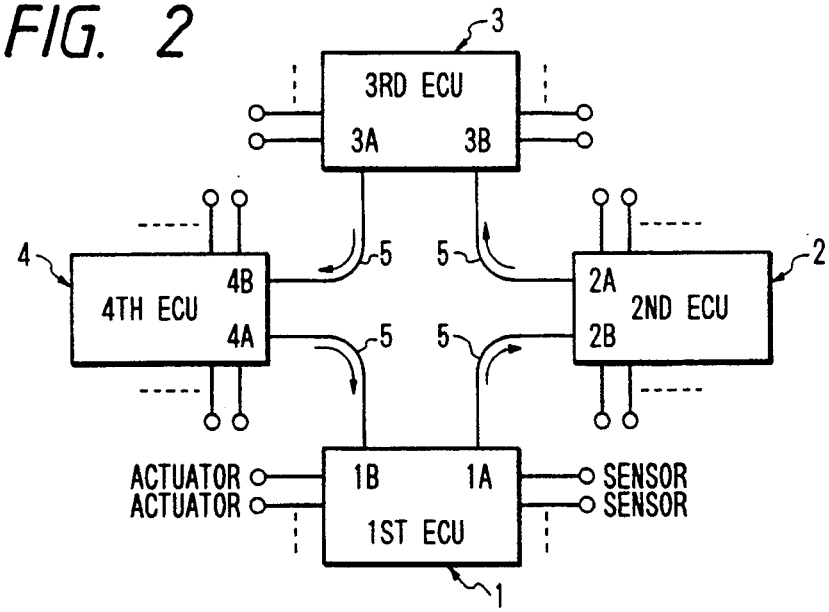
FIG. 4
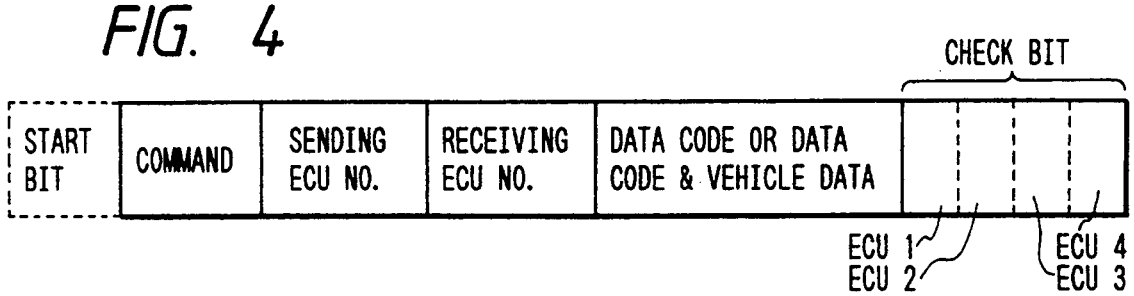
FIG. 5
| COMMAND |
|---|
| "SEND" |
| "REQUEST" |
FIG. 6
| DATA CODE | VEHICLE DATA |
|---|---|
| D0 | ENGINE SPEED |
| D1 | CAR SPEED |
| D2 | INTAKE AIR FLOW |
| D3 | COOLING WATER TEMPERATURE |
| D4 | THROTTLE ANGLE |
| D5 | IGNITION TIMING |
| D6 | BATTERY VOLTAGE |
| ⋮ | ⋮ |

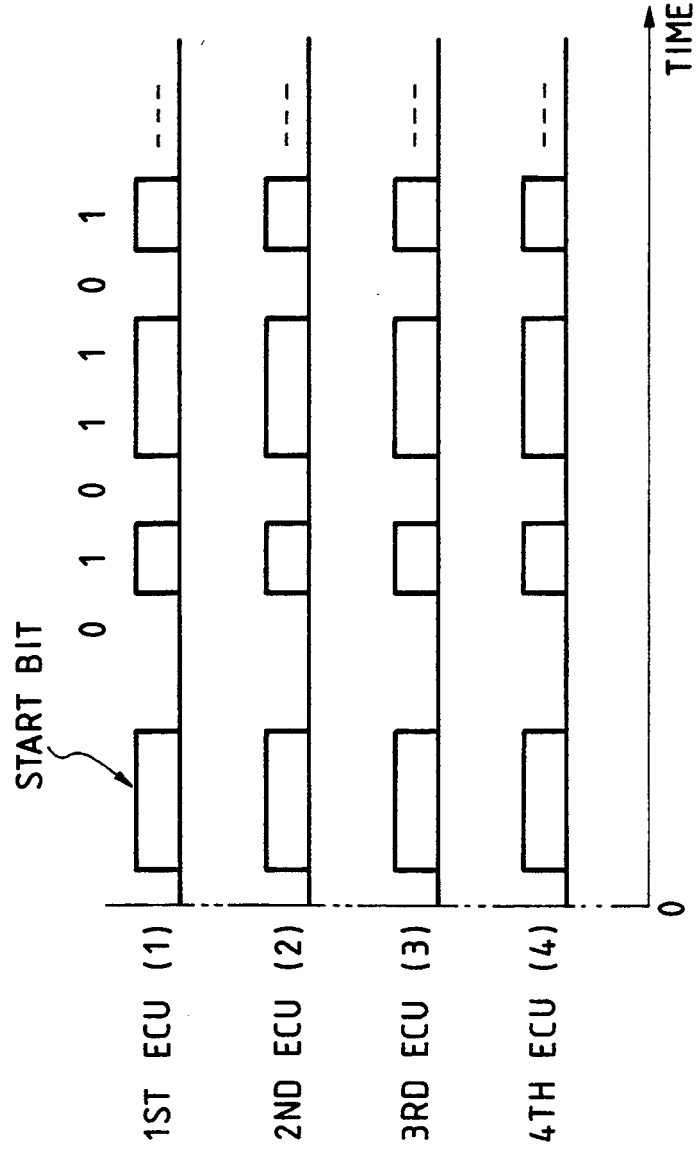

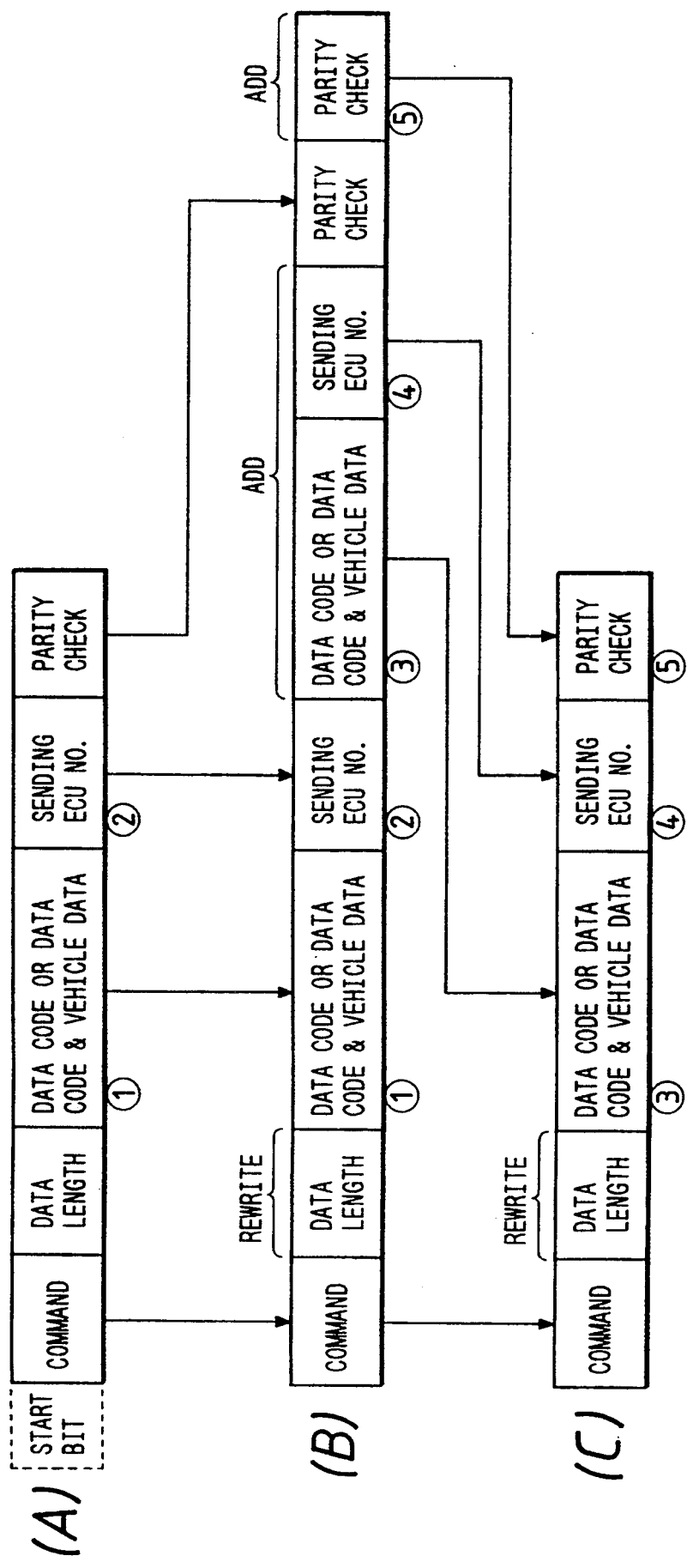

DATA TRANSMISSION SYSTEM USING AN OPTICAL FIBER LOOP

BACKGROUND OF THE INVENTION

1. Field of the Invention

The present invention is related to a data transmission system, and particularly to a data transmission system which can perform data transmission from a computer or data processing unit to another one or more computers in a simple construction and at high speed.

2. Description of the Prior Art

In automobiles, motorbicycles and the like (hereinafter simply referred to as vehicles), many functions such as spark control of the engine, fuel injection control, automatic gear change control, driving force control, brake control, suspension control, air-conditioning control and self-diagnostics are performed by an electronic control unit (hereinafter referred to as ECU) including a data processing unit such as a microcomputer. Since performance of one microcomputer is insufficient for performing such a plurality of controls, separate microcomputers are used for each control task or a group of them.

Since these plurality of microcomputers often use common vehicle data such as engine speed, vehicle speed and temperature, the load of each microcomputer is reduced if data communication is performed between these microcomputers for data sharing.

As to data communication, the technique of LAN (Local Area Network) in the usual electronic communication field is well known, but, if the system of LAN is directly applied to a carborne data transmission system, the system can be unsuitably large-scale.

On the other hand, a data transmission system for vehicles which does not use the LAN technique is also described, for instance, in the Japanese Patent Kokai 62-257239 official gazette. In this system, an input/output interface provided with a shift register is connected to each of a plurality of electronic control units, and the shift registers are serially connected to each other to form a loop transmission path, and data are sequentially transmitted in the transmission path by outputting data bit-by-bit into the shift registers.

In the above-mentioned prior art data transmission system, if it is attempted to send out data to the loop transmission path in the system, data are output bit-by-bit to the shift registers constituting the transmission path. The output data are shifted bit-by-bit in synchronism with the synchronizing signal for data transmission. In this system, data sent from a microcomputer are sent to the next microcomputer after first being stored in a register, and thus there is a transmission delay for the data length to be sent to the next microcomputer.

The data delay increases as the number of the connected microcomputers increases, and therefore the number of connectable microcomputers is limited if high-speed processing is desired in engine control or the like.

Since synchronizing signal generator means and a transmission control unit are required for preventing data collision, the construction of the data transmission system becomes complicated.

Further, optical fiber is often used as the transmission path between microcomputers (refer to the U.S. Pat. No. 5,025,142, and optical beam splitters such as half mirrors or bidirectional distributors are required in order to connect signal processing units such as microcomputers to the optical fiber transmission path and distribute a signal to them. If these distributors are inserted into the optical fiber transmission path, the optical signal remarkably attenuates and repeating amplifiers are required, which leads to a complicated structure and high cost.

Here, apart from the computer performing data sending, data transmission delay can be avoided if such register as described in the above official gazette is not provided in a computer allowing the data to pass through, but, when the data passes, for instance, through a gate or the like other than the register, the data pulse width, its shape, or the like may vary during the time of passing. Such pulse change becomes more remarkable as the number of the computers constituting the data transmission system increases, and in an extreme case pulses may disappear or they may not be discriminated from the adjacent pulses. As a result, data transmission may not be accurately performed.

SUMMARY OF THE INVENTION

The present invention was made to solve the above described problems, and its object is to provide, in a data transmission system comprising a plurality of computers or data processing units wherein data transmission is performed between the data processing units via optical fiber, a data transmission system in which data transmission can be performed at high speed and there is no data collision.

The present invention is characterized in that, in a data transmission system comprising a plurality of data processing units connected to each other by optical fiber, each data processing unit comprises optical/electrical converter means for converting an optical signal supplied from the preceding data processing unit through the optical fiber to an electrical signal, electrical/optical converter means for converting an electrical signal to be sent to the succeeding data processing unit to an optical signal, a data receiving unit for receiving the output of the optical/electrical converter means, means for determining whether the received data was sent from the local data processing means, and gate means connected between the optical/electrical converter means and the electrical/optical converter means, the gate means being closed when the local data processing means performs data transmission and opened for alternative data receiving/passing.

BRIEF DESCRIPTION OF THE DRAWING

FIG. 2 is a schematic block diagram of a first embodiment of the present invention.

FIG. 4 is a diagram showing the data format of a frame which is send by each ECU in the first embodiment of the present invention.

FIG. 5 is a diagram showing the contents of a command.

FIG. 6 is a diagram showing an example of data code and vehicle data.

FIG. 11 is a diagram showing an example of the output signals of the first ECU 1 to the fourth ECU 4 when the first ECU 1 outputs a frame.

FIG. 12A shows a frame structure accumulated in the sending register of the first ECU when a frame is sent from the first ECU in the first embodiment of the present invention.

FIG. 12B shows a frame structure received by the receiving register of the first ECU after circulating through the data transmission system.

FIG. 13 is a diagram showing a frame structure (A) applied to a second embodiment of the present invention, and a frame structure (B) when other data are multiplexed with the frame and a variation (C) thereof.

DETAILED DESCRIPTION OF THE PREFERRED EMBODIMENTS

The present invention is now described in detail with reference to the accompanying drawing. FIG. 2 is a schematic block diagram of the first embodiment of the present invention. In that figure, the first electronic control unit or data processing unit (hereinafter referred to as "ECU") 1 to the fourth ECU 4 respectively include a microcomputer, and use the outputs of associated various sensors or the various data calculated in other ECU's to perform a predetermined operation, thereby to control the associated various actuators.

The first ECU 1 to fourth ECU 4 are provided with output terminals 1A to 4A and input terminals 1B to 4B, respectively, and are daisy-chained by connecting the output terminals and input terminals of the respective adjoining ECU's by optical fiber lines 5. When the respective ECU's perform data transmission, data are sent from those output terminals, and transmitted in the direction shown by arrows in the figure in a circulative manner.

Figure 1:
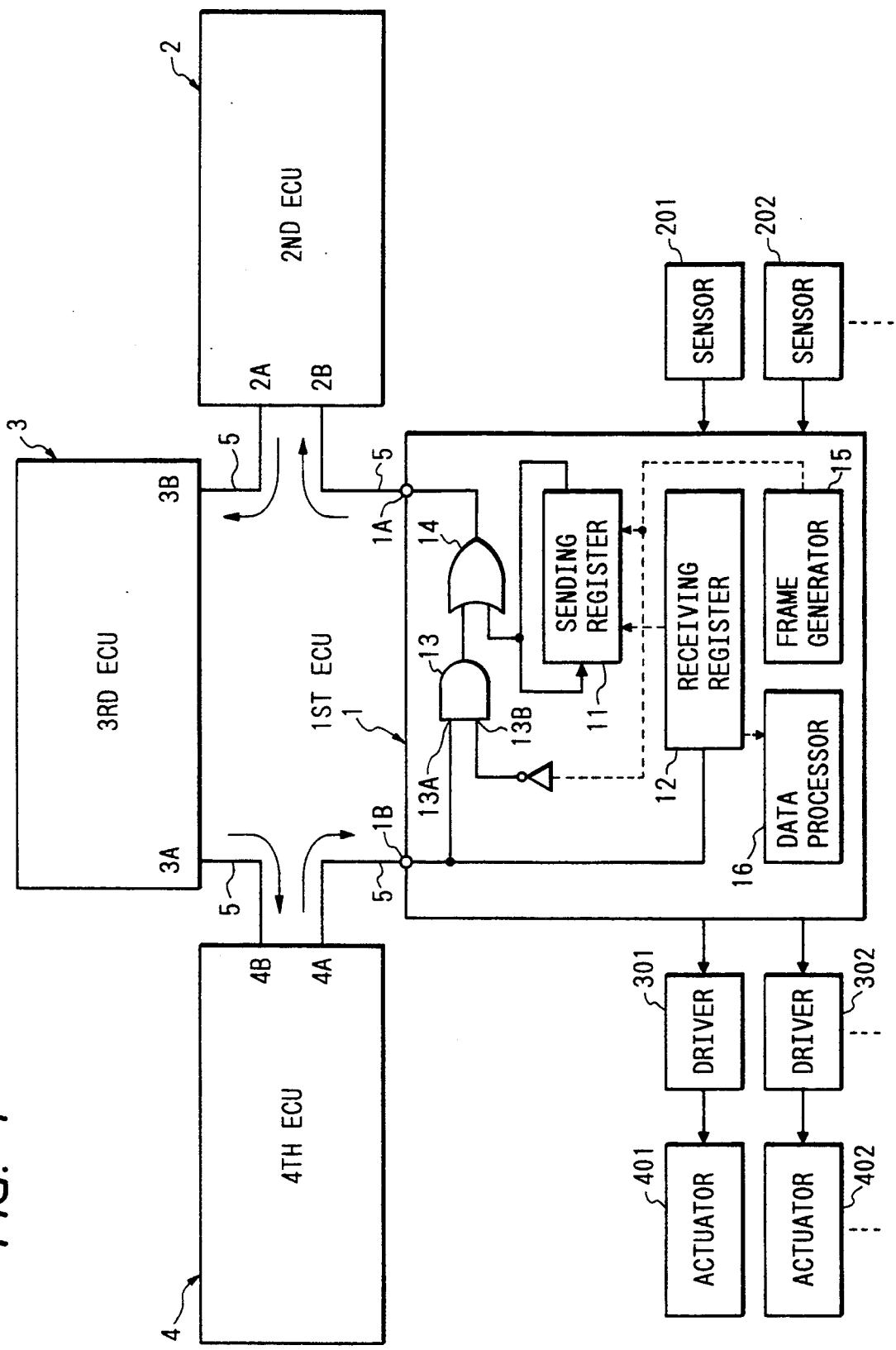
FIG. 1 is a functional block diagram of the ECU's of the embodiment of FIG. 2.

FIG. 1 is a functional block diagram of the embodiment of FIG. 2. In these figures, the same symbols represent the same or identical portions. Since the first to fourth ECU's 1 to 4 have the same configuration, respectively, only ECU 1 is shown in detail.

Now, the operation of the first embodiment of the present invention Is briefly described using FIG. 1. When each ECU 1 to 4 performs data transmission, It generates and sends a frame of a predetermined number of bits as shown in FIG. 4. First to fourth ECU's 1 to 4 respectively include sending register 11 for storing a frame to be sent, and receiving register 12 for storing a received frame. The second input terminal 13B of AND gate 13 becomes a "L" (low) level and AND gate 13 closes when a frame is sent (in a data transmission mode), and the second input terminal 13B becomes a "H" (high) level and the AND gate 13 opens when a frame is not sent (in a data receive/pass mode).

For instance, if second to fourth ECU's 2 to 4 are in the data receive/pass mode and first ECU 1 is in the data transmission mode for sending a frame to other ECU's (second to fourth ECU's 2 to 4), the frame generated in frame generator means 15 is temporarily stored in sending register 11, and then output to the input terminal 2B of the adjoining second ECU 2 via OR gate 14, output terminal 1A and optical fiber 5. After the frame has been output from sending register 11, the output frame still remains in the sending register 11.

Since AND gate 13 of second ECU 2 is opened, the frame sent out from first ECU 1 is transferred to third ECU 3 from output terminal 2A via optical fiber 5, passing through AND gate 13 and OR gate 14 in the second ECU 2. The frame input to input terminal 2B is also transferred to receiving register 12, and vehicle data are extracted from the frame as needed and transferred to data processing means 16 for use in a predetermined calculation.

The frame of first ECU 1 transferred from second ECU 2 to third ECU 3 is then transferred to fourth ECU 4. It is further transferred from fourth ECU 4 to first ECU 1. Also in third ECU 3 and fourth ECU 4, the input frame is fetched into the respective receiving register 12, and vehicle data are extracted and transferred to data processing means 16, as necessary.

Since first ECU 1 is in the data transmission mode, AND gate 13 is closed. Accordingly, the frame having returned after making a round of the data transmission system shown in FIGS. 1 and 2 is only input into receiving register 12, and is not output again to second ECU 2. Then, first ECU 1 determines whether or not the frame received in the receiving register 12 is the frame sent by itself. If it is the frame of itself, the first ECU 1 becomes the data receive/pass mode when it does not successively sends an additional frame.

Each ETU in the data receive/pass mode (in the above example, second ECU 2 to fourth ECU 4) inverts the bit in a predetermined position of passing data, for indicating that the frame has passed the particular or local ECU. In this case, if the inversion of the bit has not been done, the local ECU having sent the data (first ECU) determines that the data transmission was not successfully performed and can transmit the frame again. It is possible that the bit inversion is performed only by the ECU which has actually fetched the data in the frame, and the ECU's through which the frame is only passing do not perform the bit inversion.

If more than one ECU, for instance, first ECU 1 and third ECU 3, send data at the same time, the frame output from first ECU 1 only stays in receiving register 12 of third ECU 3 through second ECU 2 and is not transferred to fourth ECU 4, because AND gates 13 of first ECU 1 and third ECU 3 are closed. Similarly, the data output from third ECU 3 are only received in receiving register 12 of first ECU 1 through fourth ECU 4, and are not transferred to second ECU 2.

First ECU 1 and third ECU 3 check the contents of receiving register 12, and if the frame in the receiving register 12 is that sent from another ECU, they extract vehicle data from the frame and transfer the data to data processing unit 16, as desired, and thereafter transfer the frame in the receiving register 12 to sending register 11 to transfer the frame to the adjoining downstream ECU. This allows the data to be accurately transmitted without collision even if more than one ECU send frames at the same time.

Figure 3:
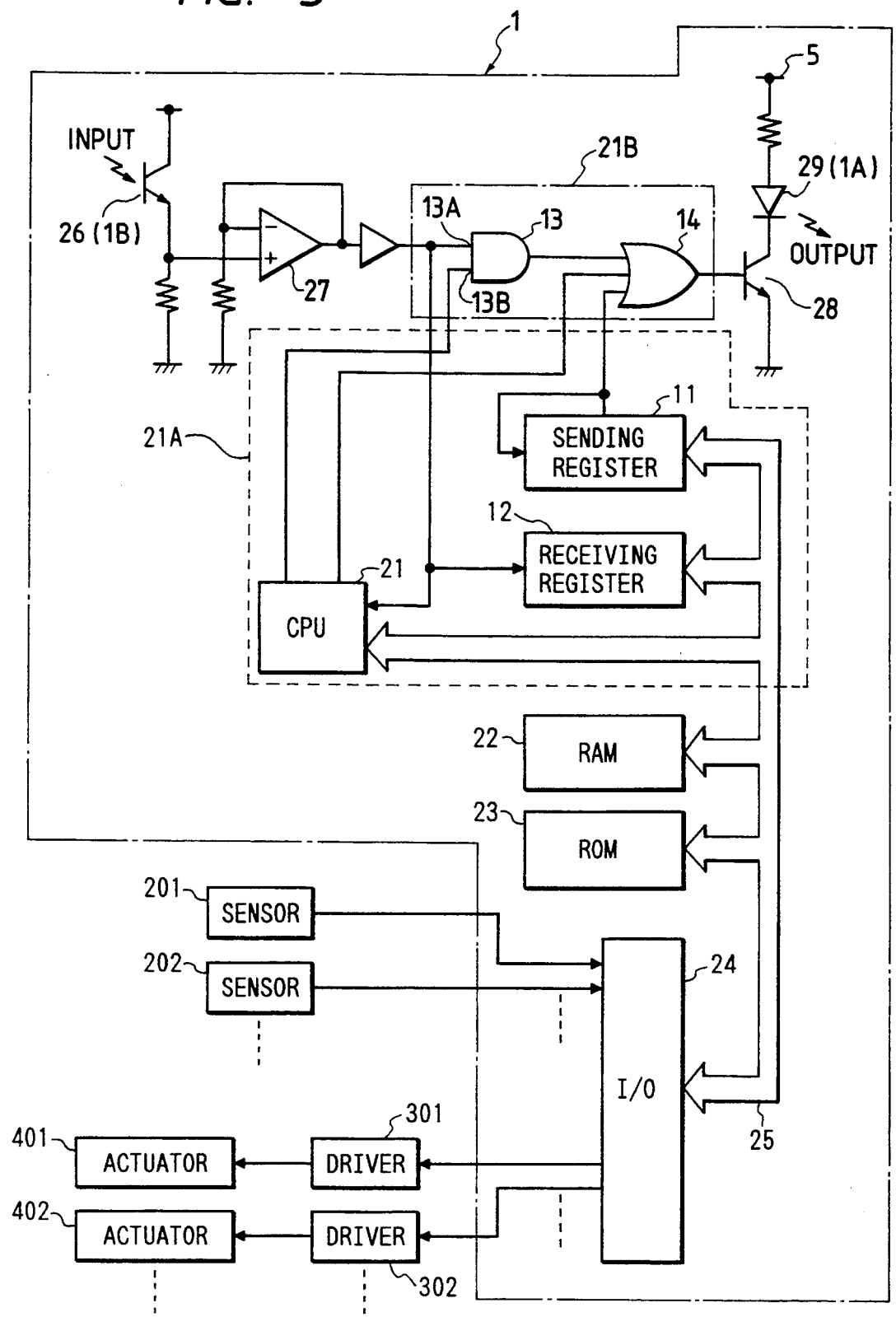
FIG. 3 is a block diagram showing the detailed construction of the first ECU in the first embodiment of the present invention.

An example of the specific configuration of first ECU 1 is shown In FIG. 3. In that figure, the same symbols as FIG. 1 represent the same or identical portions. First ECU 1 includes a microcomputer comprising CPU 21, RAM 22, ROM 23, input/output interface 24 and common bus 25. Connected to the common bus 25 are the sending register 11 and receiving register 12.

In this example, photo detector 26 serves as input terminal 1B of the first ECU 1, which receives optical data cast from an upstream ECU via optical fiber line 5 (refer to FIGS. 1 and 2) and converts them to an electrical signal. The output of photo detector 26 is compared with a voltage of a predetermined level in comparator 27, and if it exceeds the level, it is recognized to be "H" data and comparator 27 provides an output. The output is input to first input terminal 13A of AND gate 13, and also to receiving register 12 and CPU 21. CPU 21 is also connected to second input terminal 13B of the AND gate 13 and the input terminal of the OR gate 14.

The serial output terminal of sending register 11 is connected to the input terminal of OR gate 14 and to the serial input terminal of the sending register 11 itself. The output of OR gate 14 is connected to switching element 28, and by the on/off operation of the switching element 28, light emitting clement 29 or electrical/optical converter element 29, which is output terminal 1A of the first ECU 1, is controlled. Thus, the output of first ECU 1 is transmitted to the subsequent second ECU 2 via optical fiber line 5.

Sensors 201 and 202 are connected to the input/output interface 24. Actuators 401 and 402 are also connected to the input/output interface 24 via drivers 301 and 302.

The functions of sending register 11 and receiving register 12, and a part of the function of RAM 22 may be implemented by CPU 21. Further, the functions of AND gate 13 and OR gate 14 may be implemented by CPU 21. That is, the circuit element surrounded by broken line 21A and the function of the portion surrounded by chain line 21B may be implemented by a CPU.

FIG. 4 is a diagram showing an example of the data format of a frame, which is send data of each ECU. In this example, one frame consists of a start bit and five blocks. The leading first block is a command which indicates whether vehicle data such as engine speed, car speed and intake air flow are "sent" to a predetermined CPU, or the sending of such vehicle data from a predetermined CPU is "requested" (refer to FIG. 5).

The second block is an ECU number representing the sending ECU which sends the frame, and the third block is an ECU number specifying the receiving ECU by which the frame being sent is to be received (an ECU which does not only allow the frame to simply pass, but also actually fetches and uses the data in the frame).

In the fourth block, a data code corresponding to vehicle data such as engine speed, car speed and intake air flow is disposed if the first block is a "request" command, and a data code and vehicle data corresponding to the data code are disposed if the first block is a "send" command. An example of the data code and vehicle data is shown in FIG. 6.

To the fifth block, the bits of the number of the ECU's constituting the data transmission system are assigned. Each bit corresponds to each CPU. When a frame is sent from a particular ECU, by another ECU through which the frame has passed, namely by an ECU which has not sent the frame, the bit corresponding to said other ECU is inverted. The particular local ECU having sent the frame confirms inversion of the bit when the sent frame makes a round and returns, for determining whether or not other ECU's have correctly received the frame. The frame of FIG. 4 may be of a fixed bit length.

FIG. 12A shows the frame structure stored in sending register 11 of first ECU 1 when a frame is sent from the first ECU 1, and FIG. 12B shows the frame structure when the frame is received in receiving register 12 of the first ECU 1 after making a round of the data transmission system. It is assumed that the command is a "request" command and the destination of the frame is the third ECU 3 in this example.

The operation of the first embodiment of the present invention will now be described in detail. Each ECU has two modes, a data transmission mode and a data receive/pass mode, as described above. The data transmission mode includes two states, a first state in which the sending of vehicle data such as engine speed, car speed and intake air flow from another ECU is requested (the command is "request"), and a second state in which, the particular local ECU sends the frame in response to receipt of the "request" command or it positively sends the frame to another ECU (the command is "send").

Figure 7:
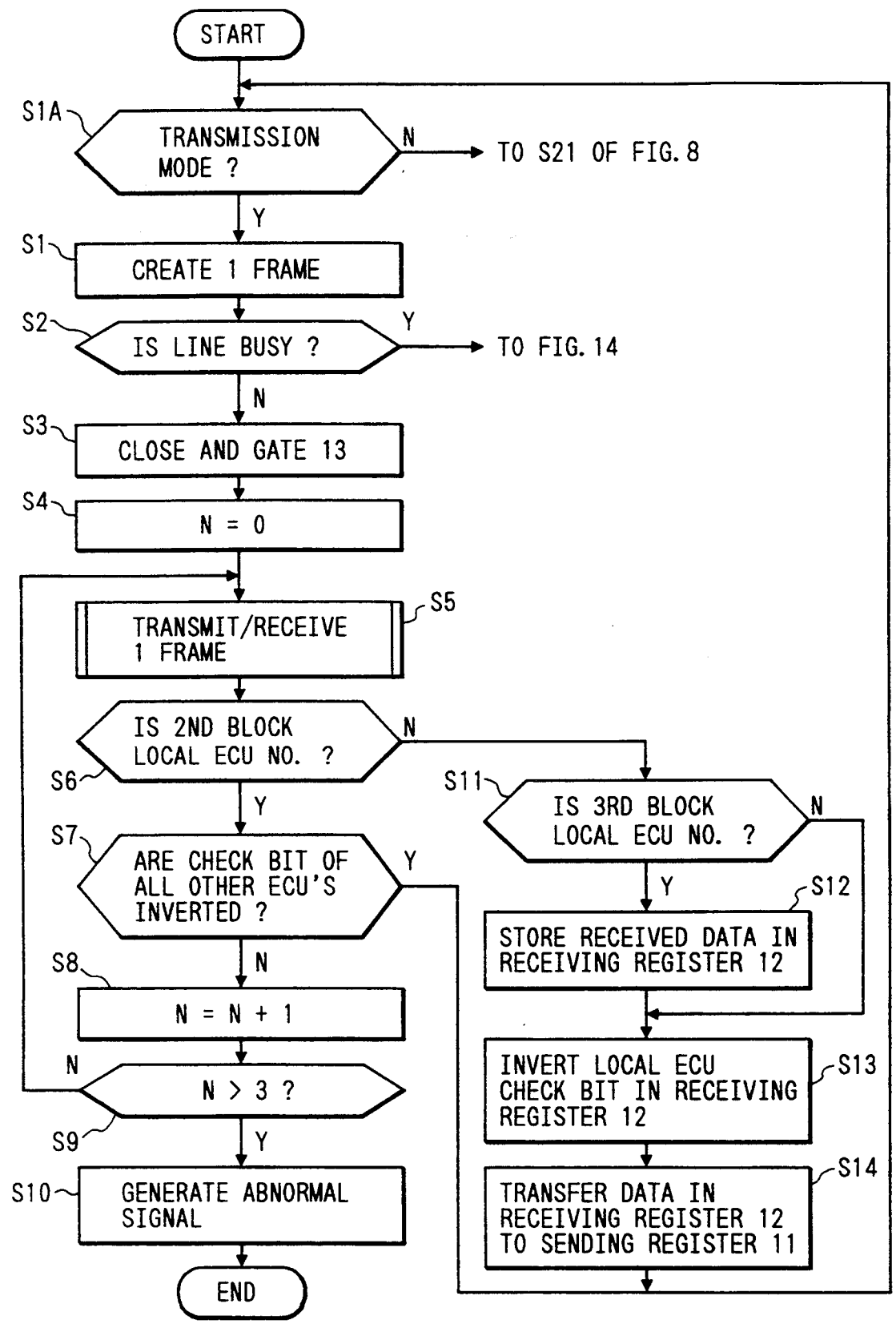
FIG. 7 is a flowchart showing the processing of the first embodiment of the present invention when the first ECU 1 is in a data transmission mode.
Figure 8:
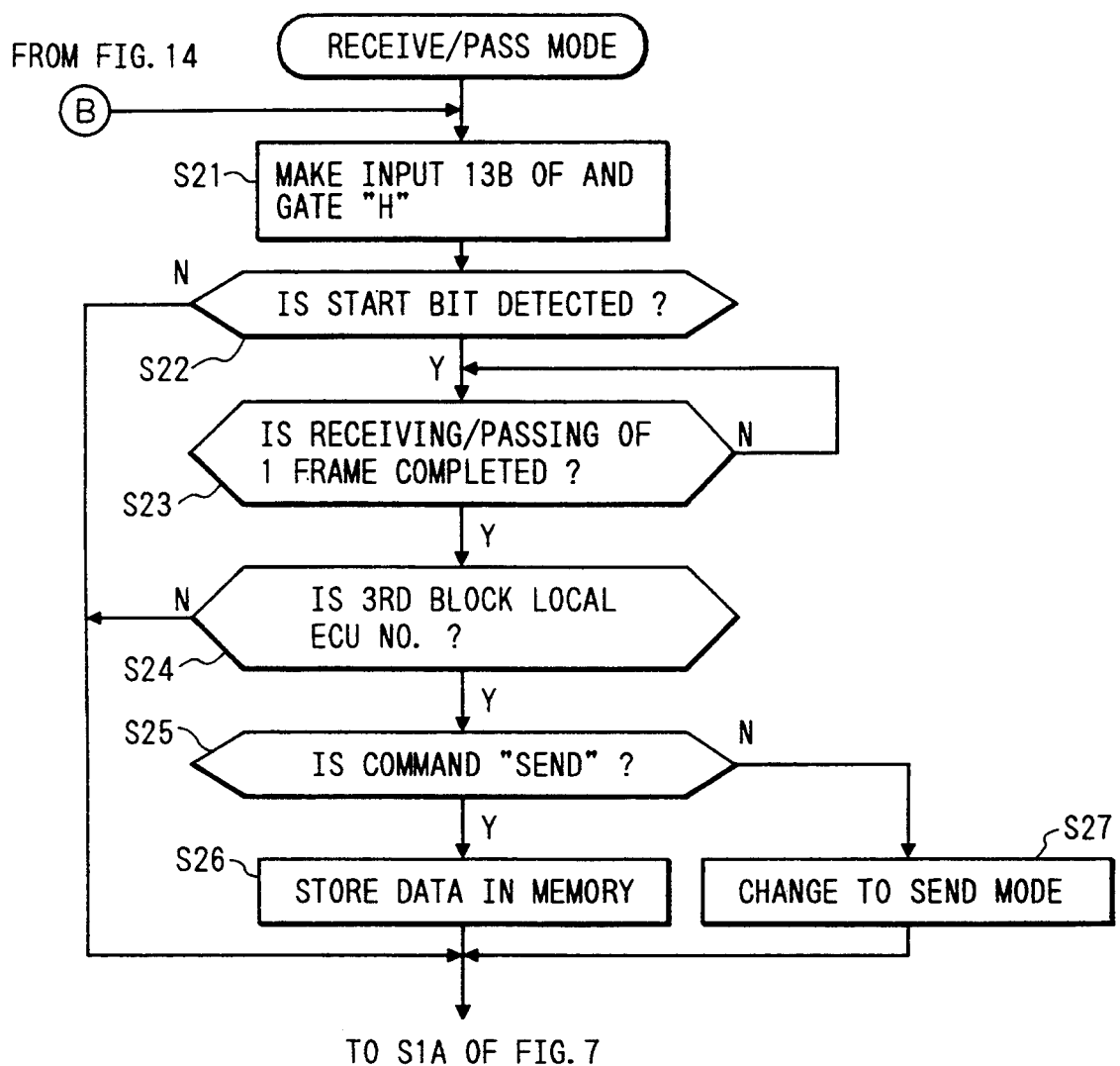
FIG. 8 is a flowchart showing the processing of the first embodiment of the present invention when the first ECU 1 is in a data receive/pass mode.
Figure 9:
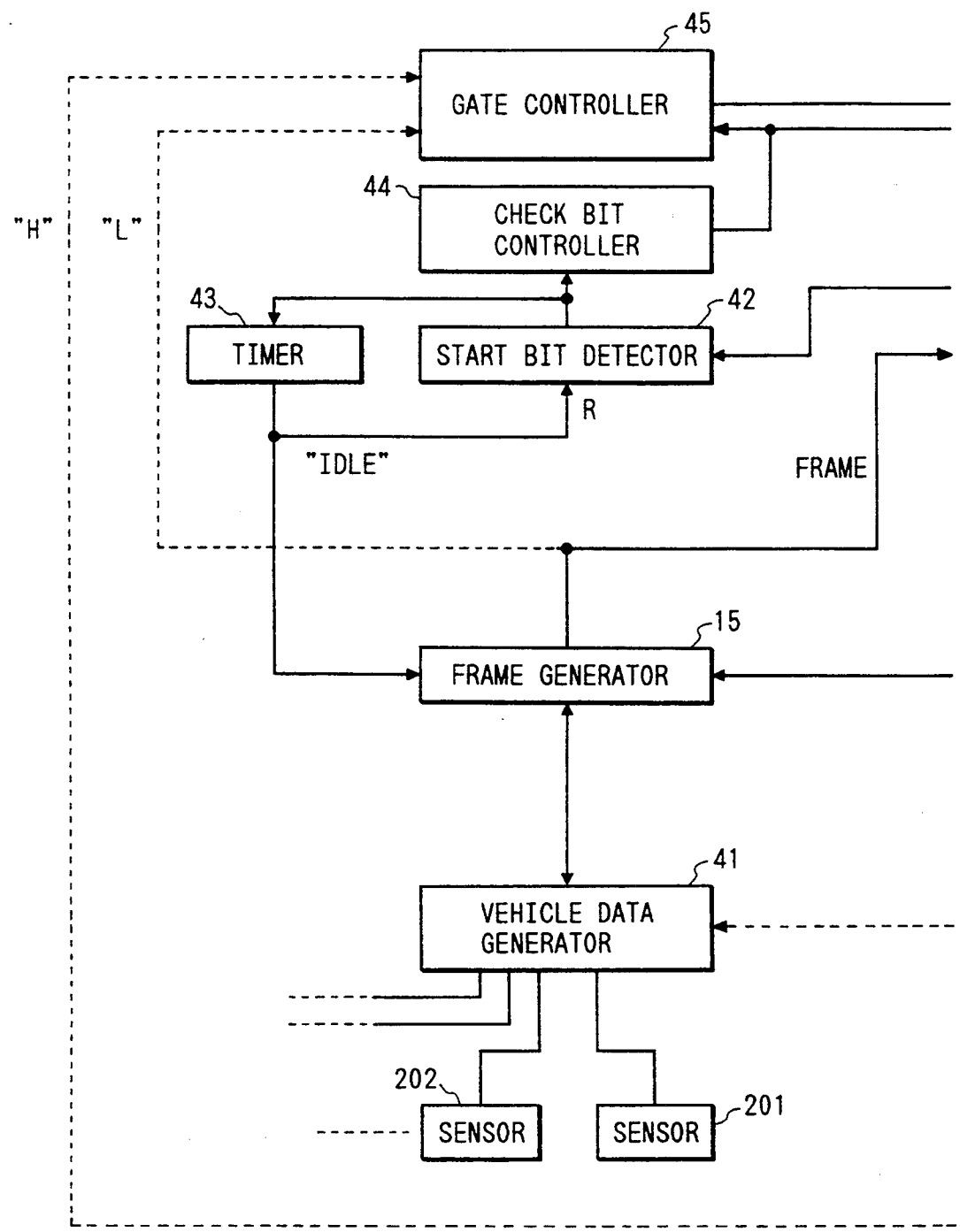
FIG. 9 is a part of the functional block diagram of the first ECU 1 of the first embodiment of the present invention, which is to be combined with FIG. 10 to construct the whole functional block diagram.
Figure 10:
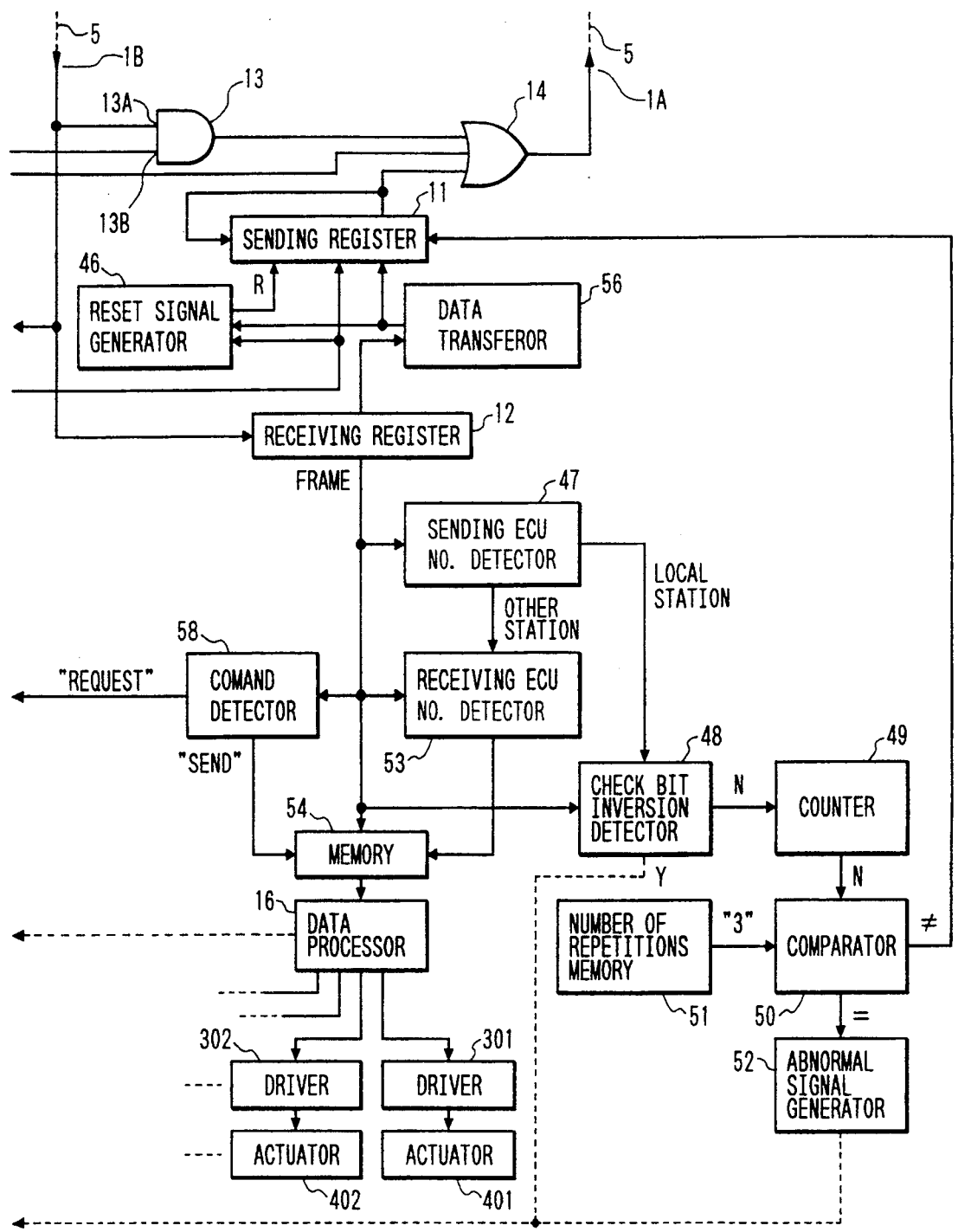
FIG. 10 is a part of the functional block diagram of the first ECU 1 of the first embodiment of the present invention, which is to be combined with FIG. 9 to construct the whole functional block diagram.

FIG. 7 is a flowchart showing an example of the processing when first ECU 1 is in the data transmission mode, FIG. 8 is a flowchart showing an example of the processing when first ECU 1 is in the data receive/pass mode, and FIGS. 9 and 10 are a functional block diagram or the first ECU 1 of the first embodiment of the present invention. The operations of FIGS. 7 and 8 are described with reference to FIGS. 9 and 10. The function and operation of the second to fourth ECU's 2 to 4 are the same as first ECU 1.

If the transmission mode judgment of step S1A of FIG. 7 is positive, the process goes to step S1 and a frame is created in frame generator means 15 (FIG. 9) by using vehicle data generated in vehicle data generator means 41. The vehicle data are generated using the output data of sensors 201,202 . . . or the data output from data processing means 16.

At step S2, it is determined whether or not the transmission line (line 5) of the data transmission system is busy. When the frame shown in FIG. 4 is sent (step S5), a start bit (synchronizing bit) is sent prior to the sending of the frame, then, if a silence state continues after the sending time of one frame (predetermined time) has elapsed since the start bit was received, line 5 is in an "idle" condition and the judgment of step S2 is negative. Particularly, when the start bit is detected by start bit detecting means 42, timer 43 is initiated, and if the elapse of the predetermined time is detected by the timer 43, timer 43 produces an output, whereby the "idle" condition of line 5 is determined. By this determination, start bit detecting means 42 is reset and frame generator means 15 becomes ready to output. If the judgment of step S2 is positive, the process skips to the insertion/transmission mode of FIG. 14.

If all the ECU's are in the data receive/pass mode and it is determined that the line is in an "idle" condition, a command of an "L" output is issued from frame generator means 15 to gate control means 45. Since this causes gate control means 45 to output "L" to second input terminal 13B of AND gate 13, AND gate 13 is closed.

After the count value N of counter 49 is reset to zero at step S4, the frame generated in frame generator means 15 is transferred to sending register 11, from which the frame is sent via OR gate 14, output terminal 1A and optical fiber 5 to downstream ECU's. The sending is sequentially performed bit-by-bit by clock pulses or pulses equivalent to them.

The later described resending of received data is performed in a similar manner. When the frame is sent, the other ECU's are in the data receive/pass mode and their AND gates 13 are opened, and thus each time one bit of the frame is sent, the bit circulates the data transmission system and is stored in the local receiving register 12. Consequently, at substantially the same time as the termination of the sending of the frame, the storing of the frame into the local receiving register 12 is also completed. FIG. 11 shows an example of the output signals of the first to fourth ECU's 1 to 4 when first ECU outputs a frame.

Prior to the frame transfer from frame generator means 15 to sending register 11, the contents of sending register 11 are reset using reset signal generator means 46, if needed. Since the serial data output terminal of the sending resister 11 is connected to the serial data input terminal thereof, the contents of the frame are not lost even if the frame is sent out from the sending register 11.

At step S6, it is determined, by sending ECU No. detecting means, whether or not the second block of the frame stored in receiving register 12 is the ECU number of the local station (the first ECU 1 itself). Since the received frame is that one sent out from the local ECU itself if the second block is the local ECU number, check bit inversion detecting means 48 is initiated and step S7 is entered.

At step S7, it is determined, by check bit inversion detecting means 48, whether or not the bits in the areas other than the local station of the fifth block of the received frame are all inverted. Since it can be determined that the sent frame successfully passed through other ECU's if the bits other than the local station are all inverted, this processing terminates and the flow returns to step S1A. Thereafter, if the judgment of step S1A is negative, the process skips to step S21 of FIG. 8, where an output command for "H" is issued from the check bit inversion detecting means 48 to gate control means 45 to open AND gate 13, and the ECU is placed in the data receive/pass mode.

If the judgment at step S7 is negative, that is, if the check bits of the other ECU's arc not all inverted, counter 49 is activated at step S8 to add 1 to the count value N. At step S9, it is determined by comparator means 50 whether or not the count value N of counter 49 has exceeded a predetermined number of repetitions (for instance, 3) set in number of repetitions storage means 51. If the number of repetitions has not been exceeded, the process returns to step S5, and "idling" of line 5 is detected as needed, and sending register 11 is activated again for resending the frame.

If the predetermined number of repetitions has been exceeded, the process moves to step S10, where abnormal signal output means 52 is activated to generate an abnormal signal, and this processing terminates. The abnormal signal is transferred by the first or the local ECU 1 to other ECU's, and used by the other ECU's to perform a predetermined abnormal processing or display.

If the all ECU's are in the data receive/pass mode, a plurality of ECU's may perform the sending of a frame at substantially the same time. Since AND gate 13 of each ECU performing the sending of a frame is closed, for instance, if first ECU 1 and third ECU 3 send a frame at the same time, the frame sent by the first ECU 1 is only stored in receiving register 12 of third ECU 3 through second ECU 2 and it is not transferred to the succeeding ECU's including fourth ECU 4.

Similarly, the frame sent by third ECU 3 is only stored in receiving register 12 of first ECU 1 and it is not transferred to the succeeding ECU's including second ECU 2. That is, in the receiving registers 12 of first ECU 1 and third ECU 3, the frames sent by the respective local stations are not received, but the frames sent by third ECU 3 and first ECU 1 which are other stations are received. In this case, sending ECU No. detecting means 47 determines that the contents in the second block of the frame is the ECU No. of another ECU (in this example, an ECU other than first ECU 1), receiving ECU No. detecting means 53 is initiated, and the process skips from step S6 to step S11.

At step S11, it is determined by receiving ECU No. detecting means 53 whether or not the third block of the received frame is the ECU No. of the local station (first ECU 1). If the third block is the local ECU No., the process moves through step S12 to step S13, and if it is the ECU No. of another station, the process directly skips to step S13.

At step S12, the data code and vehicle data contained in the fourth block of the frame stored in receiving register 12 are copied to memory 54 (RAM 22 of FIG. 3). The copied data are appropriately used for the calculation executed by data processing unit 16.

At step S13, the check bit for first ECU 1 in the fifth block of the frame stored in receiving register 12 is inverted, and at step S14, the contents of the receiving register 12 are transferred to sending register 11. Then, the process returns to step S1A. Particularly, when the contents/frame of receiving register 12 are transferred by data transfer means 56 to the subsequent ECU via sending register 11, OR gate 14 and optical fiber 5, the corresponding check bit of first ECU 1 in the fifth block is inverted by the check bit control means 44 responding to the output of receiving ECU No. detecting means 53.

Prior to the frame transfer from receiving register 12 to sending register 11, reset signal generator means 46 is activated to reset sending register 11.

Thus, the frame sent by third ECU 3 and stored in receiving register 12 is transferred to sending register 11, and sent out from the sending register 11 to the downstream second ECU 2 via OR gate 14, electrical-/optical converter means (output terminal 1A) and optical fiber 5. By this, the frame is returned to the sending third ECU 3. Since a similar processing is also performed in third ECU 3, eventually, receiving register 12 of first ECU 1 also receives the frame which was output from the first ECU 1 itself.

At step S21 of FIG. 8, second input terminal 13B of AND gate 13 is change to "H" level. By this, AND gate 13 is opened, and the frame received at input terminal 1B is stored in receiving register 12 and simultaneously transferred from output terminal 1A to the downstream second ECU 2 via OR gate 14.

At step S22, it is determined whether or not the start bit has been detected by start bit detecting means 42. If the start bit has been detected, it is determined at step S23 whether or not the storing of one frame into receiving register 12 has completed and it has already passed through the first ECU 1.

While the frame is passing through the first ECU 1, the first ECU 1 inverts the check bit in the fifth block of the passing frame which is corresponding to the first ECU 1.

This inversion is performed by activating check bit control means 44 if start bit detecting means 42 detects the start bit in the data receive/pass mode. Specifically, it is performed at the timing when the check bit passes through AND gate 13, by changing check bit control input terminal 13B to an "L" level for closing AND gate 13, and simultaneously sending an inverted bit of the check bit to OR gate 14. Check bit control means 44 changes again second input terminal 13B to "H" after the passing of the check bit. Alternatively, AND gate 13 may be closed by gate control means 45 when the check bit is made zero, and conversely, if the check bit is made one, the input from check bit control means 44 to OR gate 14 may be made one.

If the completion of receiving/passing of one frame is confirmed at step S23, it is determined, at step S24, by receiving ECU No. detecting means 53 whether or not the third block of the received frame is the ECU No. of the local station (first ECU 1). If it is not the local ECU No., the process returns to step S1A, but if it is the local ECU No., receiving ECU No. detecting means 53 activates command detecting means 58 and the process goes to step S25.

At step S25, it is determined by the command detecting means 58 whether or not the first block of the frame received in receiving register 12 is a "send" command. If it is a "send" command, the contents (data code and vehicle data) of the fourth block of the received frame are stored in memory 54 at step S26, in a manner similar to step S12 of FIG. 7. These data are used for the calculation executed by data processing means 16, as needed. Then, the process returns to step S1A of FIG. 7.

If the command detecting means 58 detects a "request" command, the judgment at step S25 becomes negative and the mode changes to a send mode at step S27, and the process skips to step S1A of FIG. 7. And, frame generator means 15 is activated to receive necessary vehicle data from vehicle data generator means 41, and creates and transfers a predetermined frame to sending register 11, from which the frame is output on optical fiber 5. If the first block is a "request" command, the data code of the required vehicle data is set in the fourth block of the frame, and thus in the frame generator means 15, the vehicle data corresponding to the data code are fetched from vehicle data generator means 41 to form a frame.

The third block of the frame (FIG. 4) may be omitted. That is, if the data code (fourth block) of the frame received in receiving register 12 is always monitored, it is possible to receive vehicle data corresponding to the data code or send required vehicle data, as necessary. In this case, it is required to provide means for detecting the data code instead of receiving ECU No. detecting means 53.

Inversion of the check bit corresponding to an ECU in the fifth block does not always need be performed. That is, the fifth block can be eliminated. Inversion of the check bit may be performed, for instance, only by the destination ECU of a frame (namely, the receiving ECU to be stored in the third block).

Although the frame is of a fixed bit length in the above description, for instance, the fourth block or the like may be of variable length data. In this case, data indicating the bit length of the frame or the fourth block should be added to an appropriate position of the frame.

Although the individual ECU's constituting the data transmission system have been described as being connected in a daisy chain, they need not be daisy-chained if confirmation of the check bit inversion is not performed. For instance, in the system of FIGS. 1 and 2, one of the lines 5 connecting the respective ECU's can be omitted.

In the above embodiment, if a frame is sent from one ECU, the transmission of this frame must be ended before any other ECU can send a frame in principle, but in the second embodiment of the present invention which is shown below, by multiplexing data through addition of another data by other ECU when the frame sent from the one ECU passes through said other ECU, other data transmission is allowed without waiting for termination of the sending of the first one frame. In the second embodiment, the individual ECU's are again connected in a daisy chain.

An example of the frame employed in the second embodiment is shown in (A) of FIG. 13. In the figure, a frame consists of a start bit (not shown), command, data length, data code (or data code and vehicle data), No. of the ECU which sends the frame, and parity check portion. The data length is the total number of bits of the subsequent data code (or data code and vehicle data) and the sending ECU No. of the frame, and the parity check portion is an area in which a parity bit is disposed.

Figure 14:
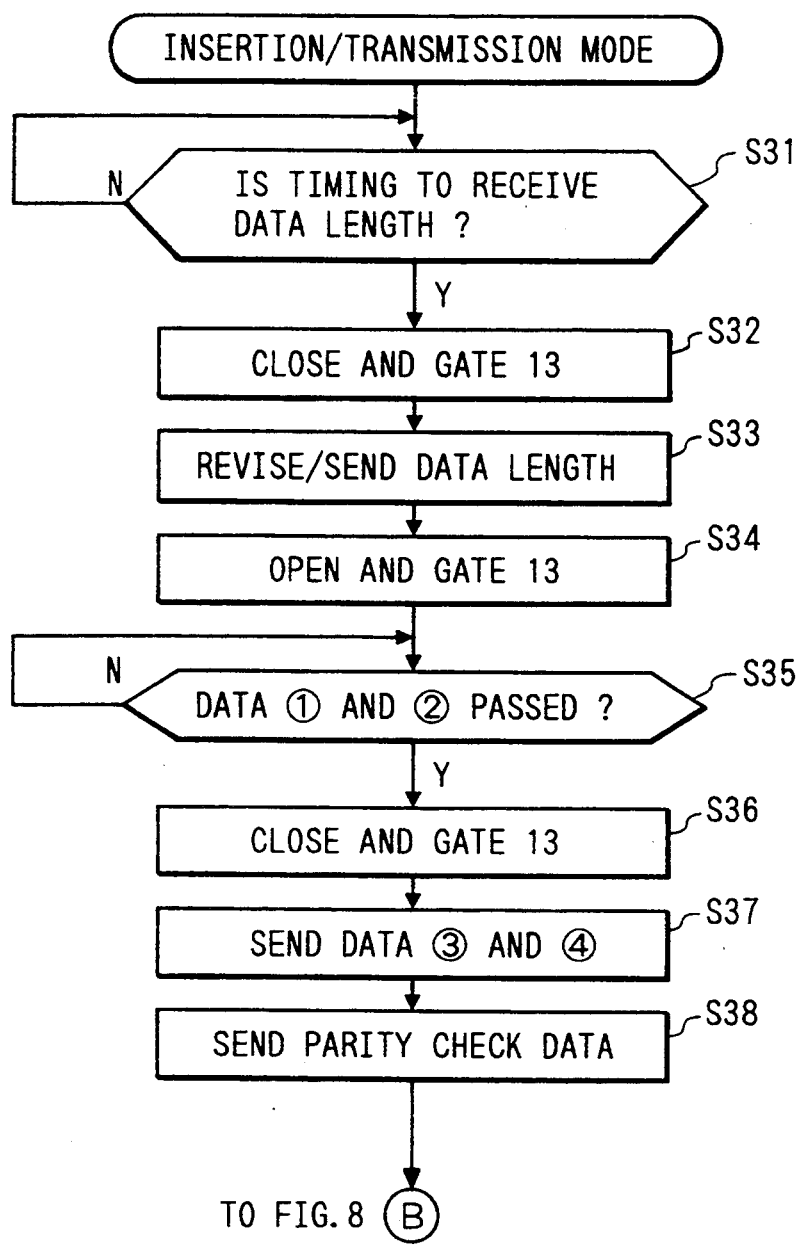
FIG. 14 is a flowchart showing the method of data multiplexing in the second embodiment of the present invention.

For instance, as shown in FIG. 1, let us assume that first to fourth ECU's 1 to 4 are connected in a daisy chain, and first ECU 1 has sent out a frame (A) of FIG. 13 (the command is "send"). The operation is shown in FIG. 14 for the case where second ECU 2 wants to send out a frame from itself (the command is "send") after the frame from first ECU 1 was begun to be sent out.

Since second ECU 2 is in the data receive/pass mode and AND gate 13 is opened, the received data are directly output from output terminal 2A and simultaneously stored in receiving register 12. In addition, the process of FIG. 14 is performed, for instance, when the judgment of step S2 in FIG. 7 is positive, and the process is executed each time one bit is received in real time.

Also in the second embodiment, similarly to the first embodiment, if the frame stored in the receiving register 12 is that sent from another ECU, the frame temporarily stored in the receiving register 12 is transferred to sending register 11 to transfer the frame to the adjacent downstream ECU. This allows data to accurately be transmitted without collision even if more than one of the ECU's sent a frame at the same time.

At step S31, it is determined whether or not it is the timing to receive the "data length" item in the frame. If it is that timing, second input terminal 13B of AND gate 13 is changed to "L" at step S32 to close the AND gate 13. At step S33, the data length is revised (increased or decreased) in the second ECU 2 and sent out from output terminal 1A. The data length having been received is a sum of the data length of the data code (or data code plus vehicle data) and the sending ECU No. (①  and ②  of FIG. 13) sent by first ECU 1, while the data length after revision is obtained by adding to the above sum the data lengths of tile data code (or data code plus vehicle data) and the sending ECU No. (③ and ④ of FIG. 13 (B)) to be sent from second ECU 2.

After the revised data length has been sent, and at the timing to receive the "data code" (or "data code plus vehicle data") item, the second input terminal 13B is changed to "H" to open the AND gate 13 at step S34, and at step S35, it is determined whether or not the data ① and ② sent from first ECU 1 have passed. After they have passed, AND gate 13 is again closed at step S36, and at step S37, the data ③ and ④ are sent, which data the second ECU 2 should add to the frame and send out. By the process mentioned above, data are multiplexed.

Subsequently, at step S38, the parity check data sent from first ECU 1 and temporarily stored in second ECU 2, and the parity check data to be sent by the second ECU 2 are sent. Thereafter, the process is ended and switched to the receive/pass mode, returning to step S21 of FIG. 8 for instance. Thus, the frame sent from second ECU 2 is as shown by (B) of FIG. 13.

Accordingly, a frame like (B) of FIG. 13 returns to first ECU 1, which detects difference in the data length and executes the following processing. It deletes the data ① and ② sent from the local station (first ECU 1) as well as the parity check data sent out by the local station from the frame shown in (B) and transfers the remaining data. At this time, the data length is rewritten. In this way, a frame as shown in (C) of FIG. 13 is sent out from first ECU 1.

The data multiplexing function as described above does not need be provided in the all data processing units in the data transfer system, and for instance, it may be provided only IN one or more data processing units with high priority. Although, in (B) of FIG. 13, data ③ and ④ to be added are shown as placed after data ① and ②, they may be placed before the data ① and ②, or immediately after the data length. The commands of first ECU 1 and second ECU 2 were assumed to be the same command "send", but data multiplexing is also possible for different commands.

Of course, the configuration of the respective frames shown in the above respective embodiments is not limited to that shown in FIG. 4 or (A) of FIG. 13. Variations of the frames can easily be created by those skilled in the art.

The third embodiment of the present invention is now described. In the data transmission system as described above, when data sent from a particular ECU passes through other ECU's, the width of pulses constituting the data may widen or narrow as compared with the pulse width at the time of data sending.

If the pulse width becomes shorter and shorter each time a pulse passes through an ECU, the pulse may be misjudged or may disappear on the way at worst. Conversely, if the pulse width becomes longer and longer each time the pulse passes through an ECU, the pulse may be misjudged or may integrally connect with the adjoining pulses at worst. Such tendency becomes more remarkable as the number of the serially connected ECU's constituting the data transmission system increases.

Figure 15:
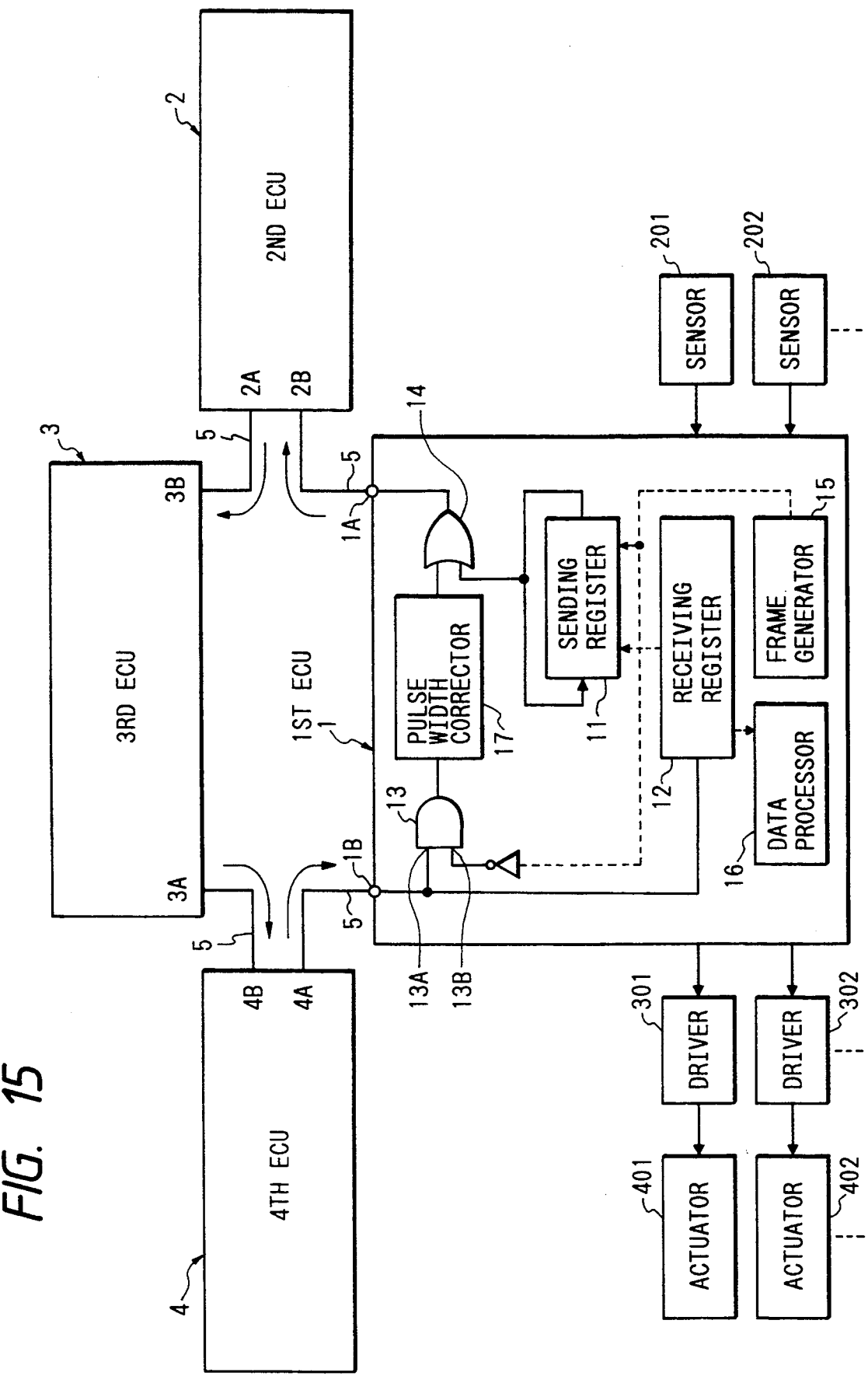
FIG. 15 is a diagram showing the functional construction of a third embodiment of the present invention.

The third embodiment is to eliminate such defect. FIG. 15 is a simple functional block diagram of the third embodiment, which is similar to FIG. 1. In FIG. 15, the same symbols as FIG. 1 represent the same or identical portions, and thus description thereof is omitted.

As shown in FIG. 15, in the respective first to fourth ECU 1 to 4, pulse width correcting means 17 is connected between the output terminal of AND gate 13 and the input terminal of OR gate 14. If the particular ECU is in the data receive/pass mode, pulse width correcting means 17 corrects the width of pulses input via AND gate 13 one by one by a later described technique, and outputs them to the adjoining ECU via OR gate 14.

Figure 16:
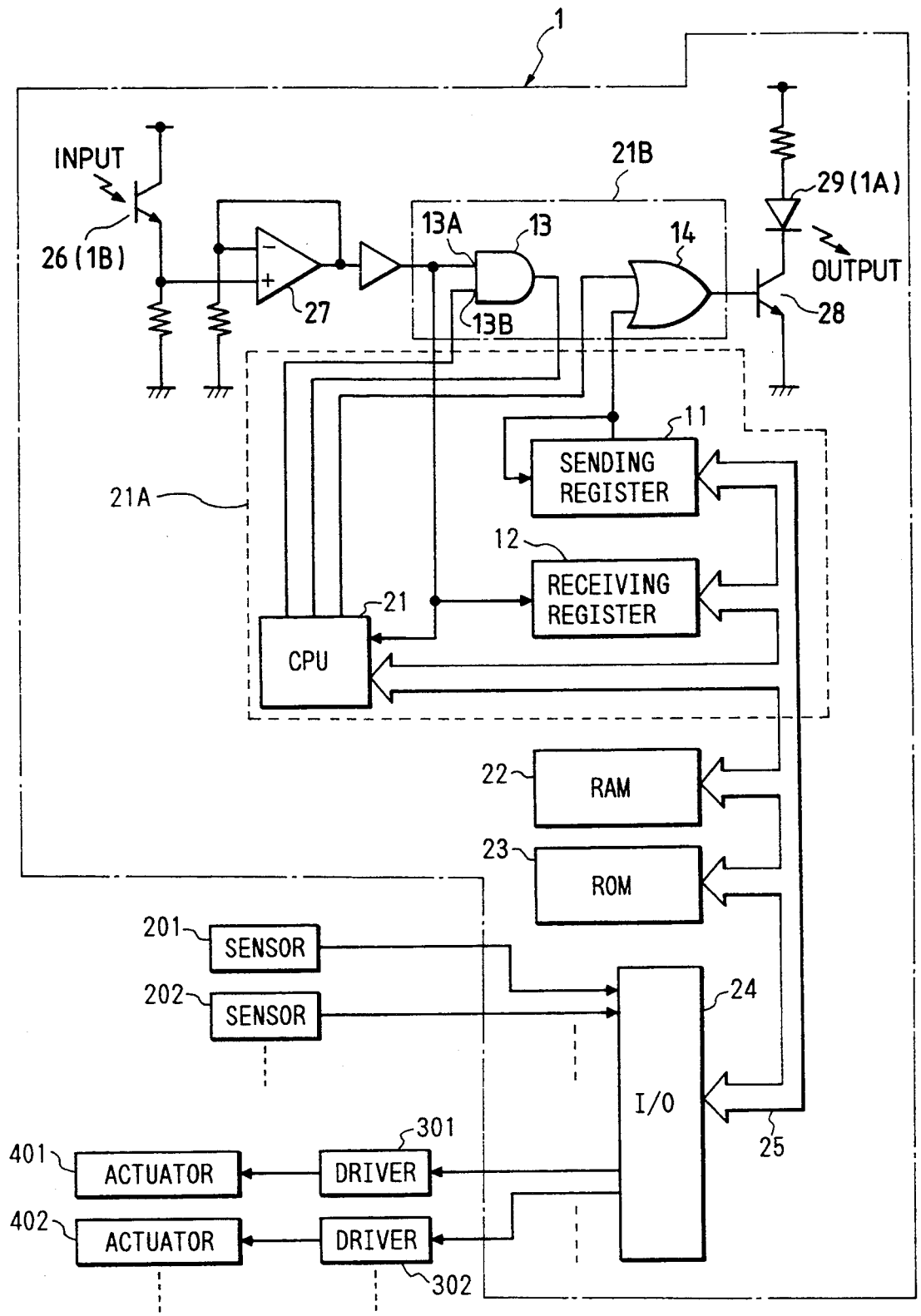
FIG. 16 is a block diagram showing the specific construction of the first ECU in the third embodiment of the present invention.

FIG. 16 is a block diagram showing the specific configuration of first ECU 1 in the third embodiment. In the figure, the same symbols as FIG. 3 represent the same or identical portions.

As obvious from comparison with FIG. 3, if AND 13 gate is opened, data output from AND gate 13 are temporarily fetched into CPU 21, subjected to a pulse width correction processing, and then output to OR gate 14.

Figure 17:
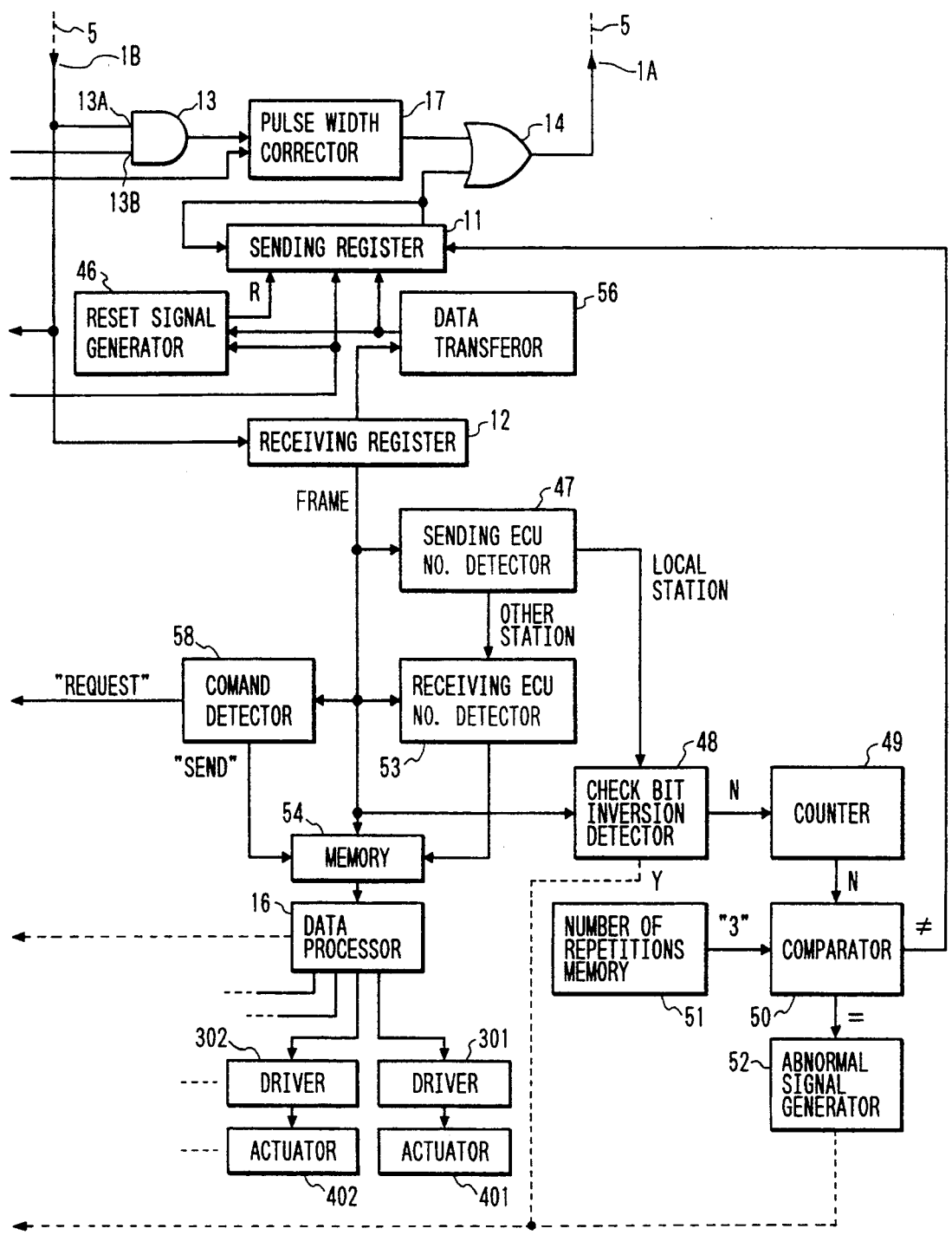
FIG. 17 is a part of the functional block diagram of the first ECU of the third embodiment of the present invention, which is to be combined with FIG. 9 to form the whole functional block diagram.

FIG. 17 is part of the functional block diagram of first ECU 1 of the third embodiment, and forms the whole functional diagram through combination with FIG. 9. In FIG. 17, the same symbols as FIG. 10 represent the same or identical portions. The configuration of FIG. 17 is obvious to those skilled in the art from the descriptions in FIGS. 10 and 15.

The specific pulse width correction technique is shown below. The following description is made to the correction technique by second ECU 2 when the second ECU 2 receives and passes the data sent by first ECU 1.

Figure 18:
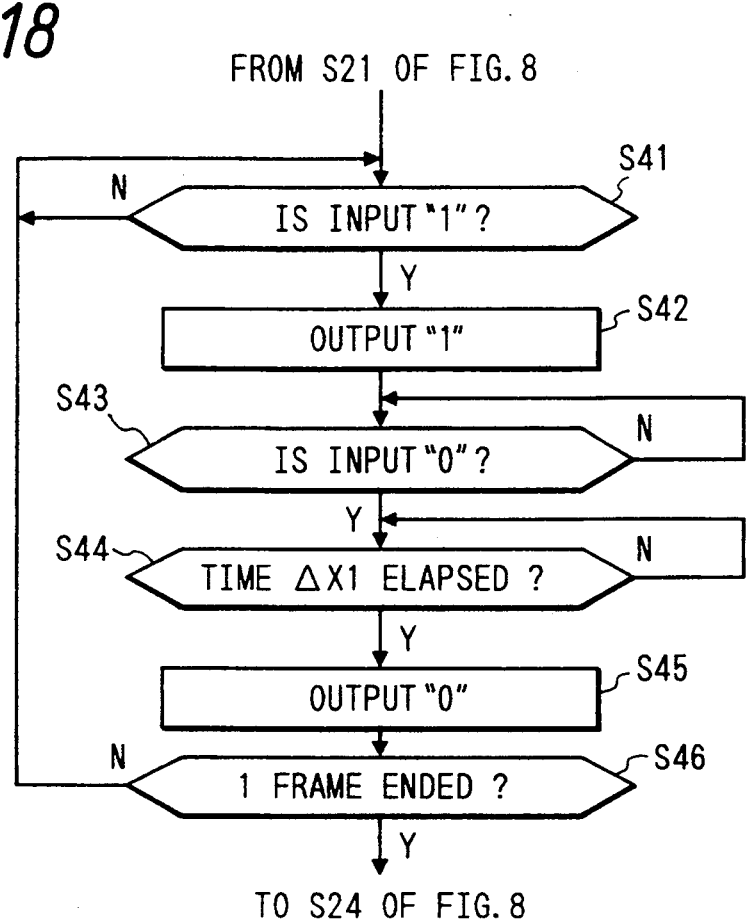
FIG. 18 is a flowchart showing an example of the pulse width correcting operation of the third embodiment of the present invention.
Figure 19:
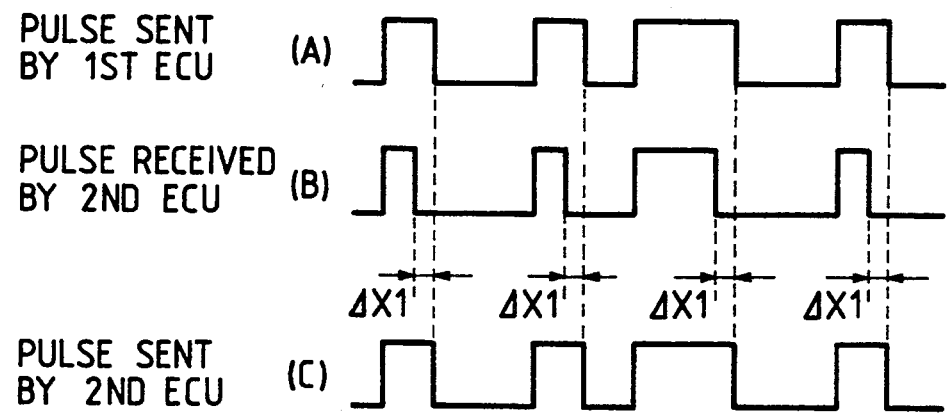
FIG. 19 is a diagram showing the pulse width correction by the processing of FIG. 18.

First, description is made to the action for the case in which the pulse width shortens. FIG. 18 is a flowchart showing an example of the pulse width correcting operation of the third embodiment. FIG. 19 is a diagram showing the pulse width correction due to the processing of FIG. 18. The processing of FIG. 18 is to replace the processings at steps S22 and S23 of FIG. 8.

Let us assume that, when the pulse sent from first ECU 1 is received by second ECU 2, the pulse width shortens by ΔX1 as shown in (A) and (B) of FIG. 19.

The pulse width is corrected (or extended by ΔX1) by the second ECU 2, whereby the width of the pulse sent by second ECU 2 is made equal to that of the send pulse from first ECU 1, as shown in (C) of FIG. 19.

In FIG. 18, first it is determined at step S41 whether or not the input signal is "1" (or "H"). If it is "1", "1" is output via OR gate 14 at step S42.

At step S43, it is determined whether or not the input signal is "0" (or "L"). If it is "0", it is determined at step S44 whether or not ΔX1 has elapsed after the input signal became "0". And after the elapse of ΔX1, at step S45, "0" is output via OR gate 14. Since the ΔX1 depends on the rise and fall characteristics of the waveform of the circuit elements of FIG. 16, it is known in each terminal station or ECU.

At step S46, it is determined whether or not data reception for one frame has ended, and if it has not yet ended, the process returns to step S41, otherwise the process skips to step S24 of FIG. 8.

Although not shown in the process of FIG. 18, it is easily understood that the input signal is also fetched into receiving register 12, and the fetched data are used for the various processings of the particular ECU, as needed.

Figure 20:
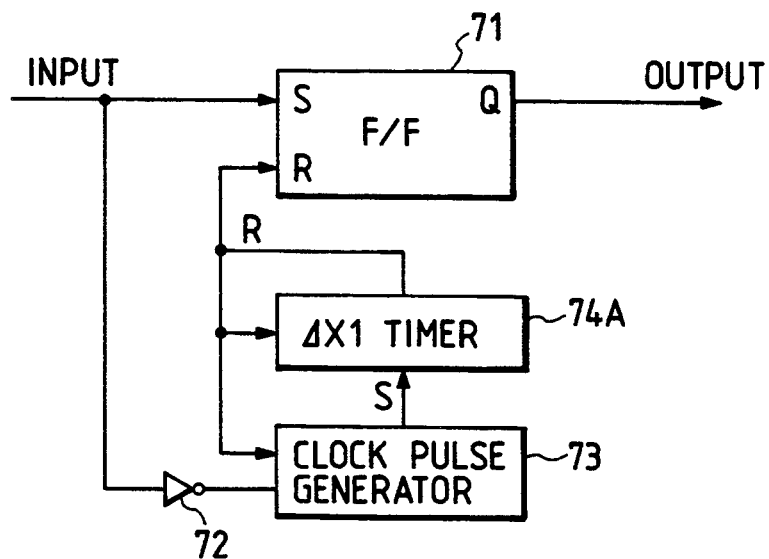
FIG. 20 is a functional block diagram for the processing shown in FIG. 18.

FIG. 20 is a functional block diagram of the pulse width correcting means which executes the process shown in FIG. 18. The input signal is supplied at set terminal S of flip-flop 71. If the input signal becomes "1", "1" is output from its output terminal Q. The input signal is also supplied to clock pulse generator means 73 via inverter 72. If the input signal changes from "1" to "0," the pulse generator means 73 is enabled to generate a clock pulse, by which timer 74A is initiated. The timer 74 measures ΔX1, and after the measurement, it resets pulse generator means 73, timer 74A and the flip-flop 71. As a result, the output signal of flip-flop 71 becomes "0."

With this configuration, if received data change so that the width of the pulse shortens, the pulse width is corrected to the original width in each case whether the transmission data is in the RZ (Return-to-Zero) form or in the NRZ (Non-Return-to-Zero) form.

It is possible that flip-flop 71 is directly reset by the output of inverter 72 and pulse generator means is provided for generating pulses for the time of ΔX1 after the reset. In addition, the later described approach of FIG. 21 may be used instead of the above-identified approach of FIG. 18.

If the pulse width becomes longer, the action is in the RZ form or the NRZ form. If it is the RZ form, since the width of one pulse is known beforehand, the original pulse width can be regenerated by generating pulses of a fixed width in synchronism with the rise of the pulses.

Figure 21:
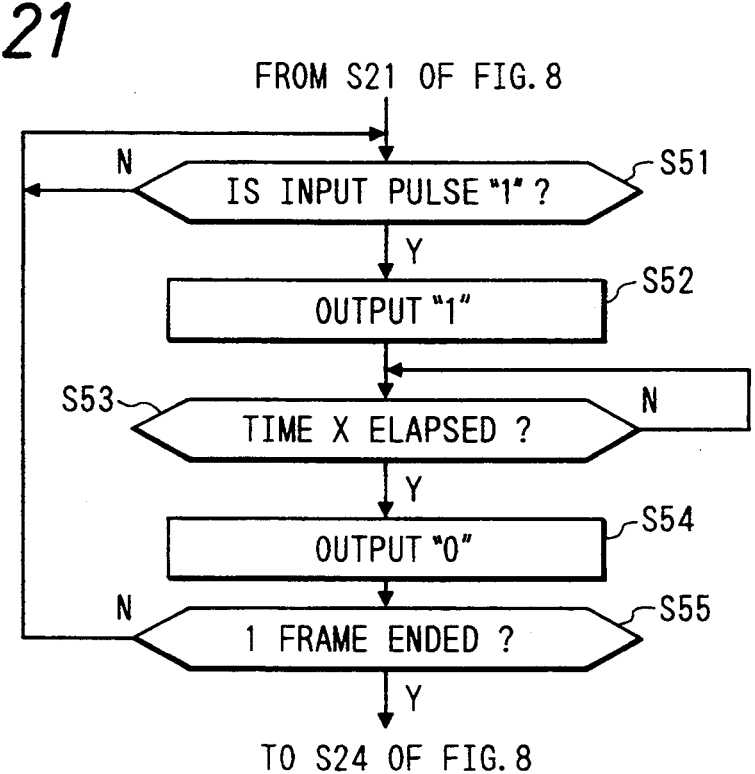
FIG. 21 is a flowchart showing a further example of the pulse width correcting operation of the third embodiment of the present invention.
Figure 22:
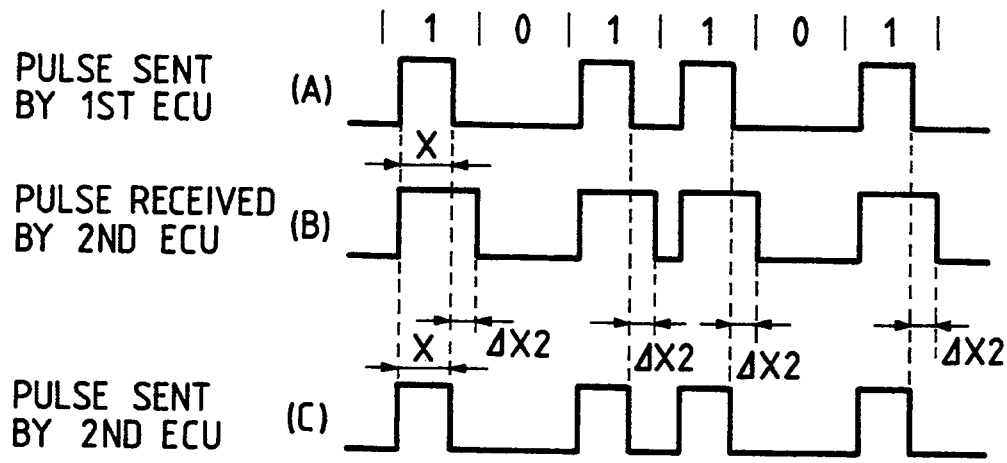
FIG. 22 is a diagram showing the pulse width correction by the processing of FIG. 21.

FIG. 21 is a flowchart showing another example of the pulse width correcting operation of the third embodiment of the present invention, and FIG. 22 is a diagram showing the pulse width change due to the process of FIG. 21. The process of FIG. 21 is to replace the processings of steps S22 and S23 or FIG. 8 as in the process of FIG. 18.

In FIG. 22, it is assumed that the pulse (B) received by second ECU 2 becomes longer by ΔX2 as compared with the pulse (A) sent by first ECU 1. The pulse width is corrected by the second ECU 2, that is, the pulse width is cut by ΔX2, whereby the send pulse width of the second ECU 2 is made the same width as that of first ECU 1, as shown in (C) of FIG. 22.

When it is confirmed at step S51 that the input pulse is "1", "1" is output and sent at step S52. At step S53, it is determined whether or not a predetermined pulse width time X has elapsed since the input pulse became "1". If the elapse of time X is detected, "0" is output at step S54. At step S55, it is determined whether or not reception of data for one frame has ended, and if not ended, the process returns to step S51, otherwise the process skips to step S24.

Also in the process of FIG. 21, the input signal is fetched into receive register 12 as described above, and the data are used for the various processings of the ECU, as desired.

Figure 23:
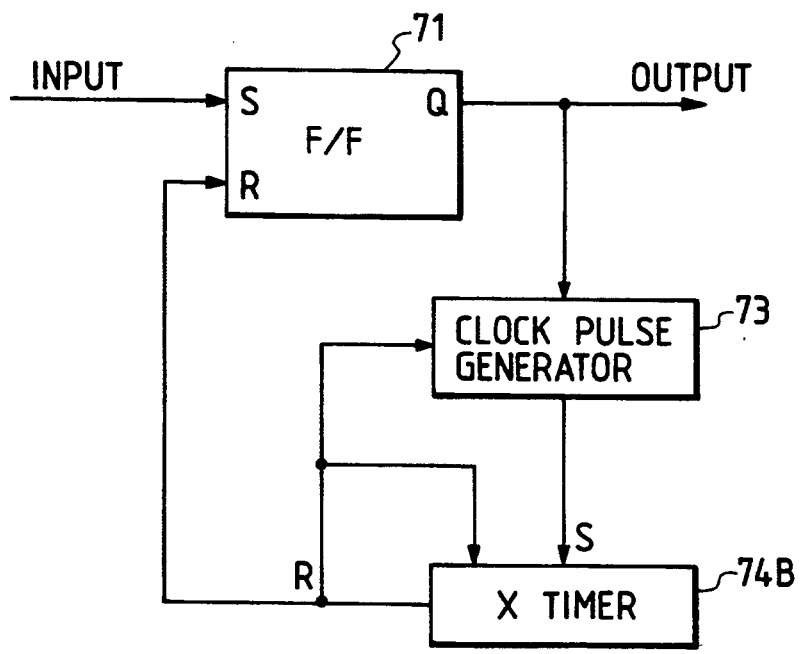
FIG. 23 is a functional block diagram for the processing shown in FIG. 21.

FIG. 23 is a functional block diagram for the process shown in FIG. 21. In FIG. 23, the same symbols as FIG. 20 represent the same or identical portions. The input signal is input to set terminal S of flip-flop 71. If the input signal becomes "1", "1" is output from its output terminal Q. The Q output is also input to clock pulse generator means 73. In consequence, if the Q output changes from "0" to "1," pulse generator means 73 is excited to initiate timer 74B. Timer 74B measures time X, and after the completion of measurement, it resets pulse generator means 73, timer 74B and the flip-flop 71. As a result, the output signal of flip-flop 71 becomes "0."

With this configuration, as obvious, when transmission data is in the RZ form, the pulse width is corrected to the original width even if the receive data has a narrow width.

If the pulse transmission form is NRZ, when plural input signals of "1" are continuously input, the pulse width depends on the number of continuing "1's", and thus the pulse width generation and correction cannot be performed by the method as shown in FIG. 21. For instance, it is served by executing the process such as FIG. 24.

Figure 24:
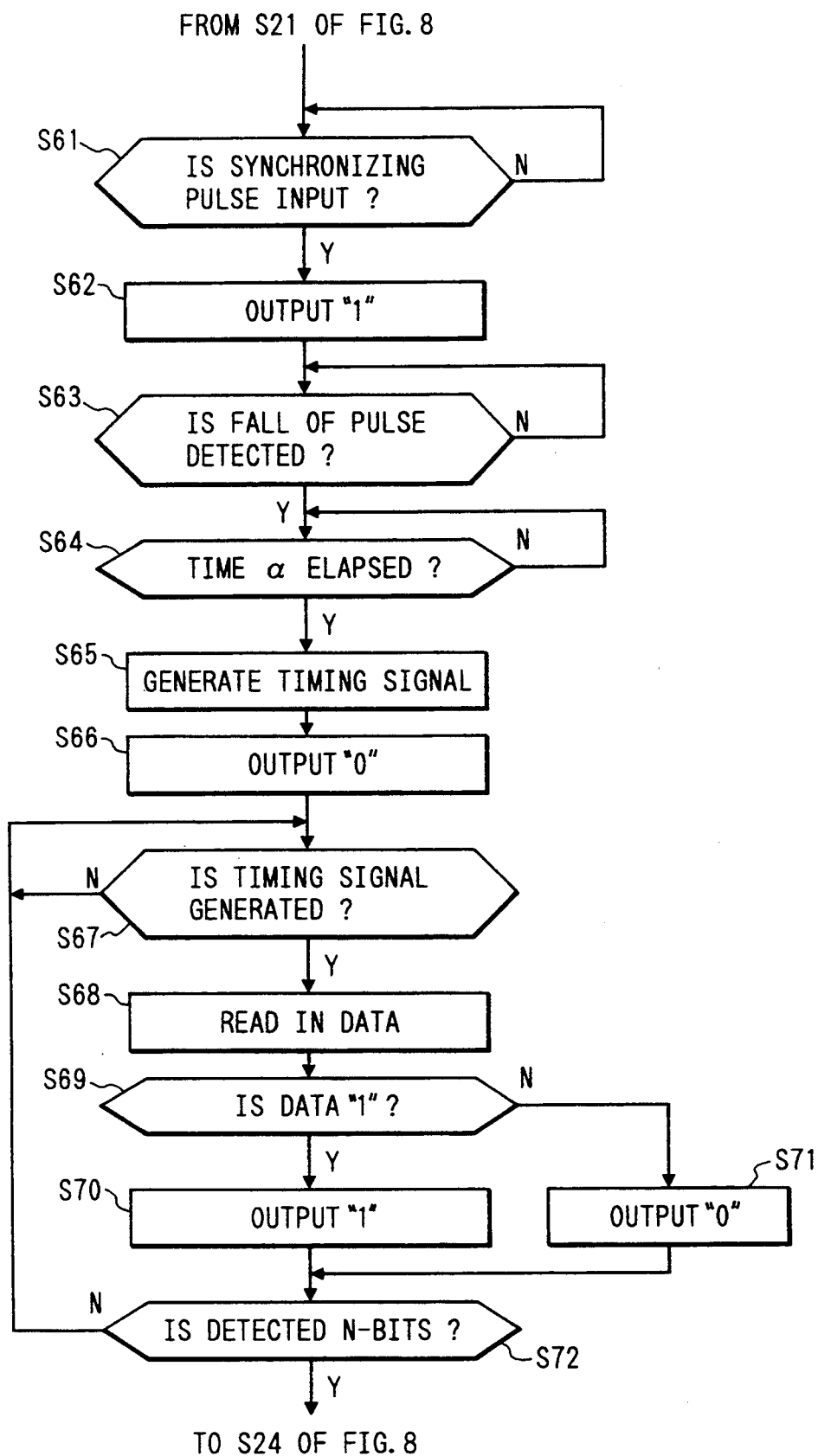
FIG. 24 is a flowchart showing a still further example of the pulse width correcting operation of the third embodiment of the present invention.
Figure 25:
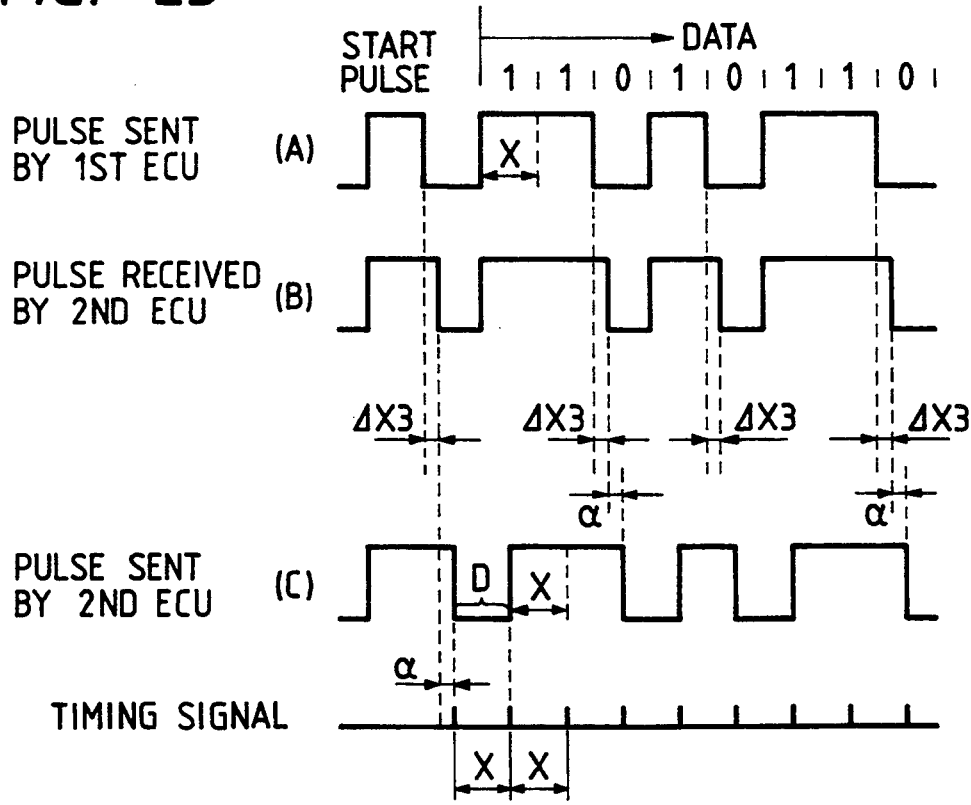
FIG. 25 is a diagram showing the pulse width correction by the processing of FIG. 24.

FIG. 24 is a flowchart showing a still further example of the pulse width correcting operation of the third embodiment of the present invention, and FIG. 25 is a diagram showing the pulse width change due to the process of FIG. 24. The process of FIG. 24 is to replace the processings of steps S22 and S23 of FIG. 8 like the processes of FIGS. 18 and 21. Incidentally, in the NRZ scheme, delay in the fall of pulses is fixed independently of the continuous length of "1" bits.

In FIG. 25, it is assumed that the fall of the pulse (B) received by second ECU 2 delays by ΔX3 as compared with the pulse (A) sent by first ECU 1. In this case, the pulse width is corrected by the second ECU 2, and the send pulse width of the second ECU 2 becomes the same as that of first ECU 1, as shown in (C) of FIG. 25.

At step S61 of FIG. 24, it is determined whether or not a synchronizing pulse (start pulse) has been input. At the beginning of one frame, a synchronizing pulse is always placed independently of the contents of the frame data. Also in the respective embodiments of FIGS. 18 to 20 and FIGS. 21 to 23, a synchronizing pulse is placed at the beginning of each frame, though not shown. If the synchronizing pulse is detected. "1" is output at step S62.

At step S63, it is determined whether or not the fall of the synchronizing pulse has been detected. If the fall has been detected, it is determined at step S64 whether or not a time α has further elapsed since the fall thereof. If the elapse of α is detected, timing signals are generated at step S65 and "0" is output at step S66. The timing signal is output by the microcomputer of the ECU executing this process at every predetermined time X after the first timing signal. The predetermined time X is equal to the predetermined one-pulse duration of the respective pulses constituting a frame.

At step S67, it is determined whether or not the timing signal has occurred, or if the step S67 is performed immediately after the processing of step S66, whether or not the timing signal next to the timing signal generated at step S65 has occurred. If the timing signal has occurred, the input signal is read in at step S68. And, at step S69, it is determined whether the input signal is "1" or "0", and if the input signal is "1", "1" is output at step S70, while if the input signal is "0", "0" is output at step S71.

At step S72, it is determined whether or not a predetermined number (N) of bits constituting one frame have been detected after the detection of the synchronizing pulse. In this example, the number of bits constituting one frame is a preset fixed value. If the N bits have not been detected, the process returns to step S67, otherwise the process skips to step S24 of FIG. 8. That is, the processing of step S72 determines whether or not the detection of one frame has ended.

In this example, the pulse width of the synchronizing pulse becomes longer than the original pulse width, but, since the predetermined time X (symbol D in FIG. 25) is maintained between the synchronizing pulse and data pulse following it, there is no hindrance to the discrimination of the data pulses.

Figure 26:
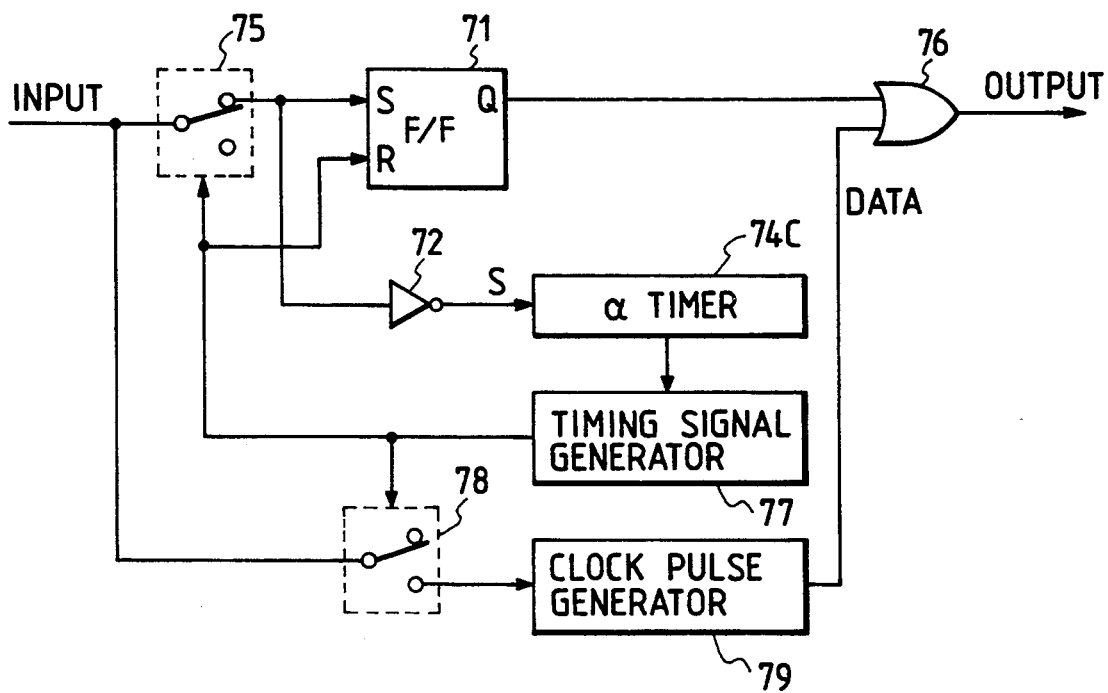
FIG. 26 is a functional block diagram for the processing shown in FIG. 24.

FIG. 26 is a functional block diagram of the process shown in FIG. 24 where the same symbols as FIGS. 20 and 23 represent the same or identical portions. In FIG. 26, the input signal is supplied to set terminal S of flip-flop 71. Since the initial state of the switching means 75 is a closed state, the Q output of flip-flop 71 becomes "1" simultaneously with the inputting of the synchronizing pulse, and the signal is output via OR gate 76.

The synchronizing pulse is also input to inverter 72. When the synchronizing pulse disappears, timer 74C is initiated to start to measure a predetermined time α. Timing signal generator means 77 is initiated after the elapse of the predetermined time α and generates timing signals at intervals of a predetermined time X. By the generation of the first timing signal, flip-flop 71 is reset to cause the output of OR gate 76 to become "0" (or to cause the synchronizing pulse to disappear) and switching means 75 to open, and the inputting of a further input signal to flip-flop 71 is interrupted.

Switching means 78 closes for only a very short time for each outputting of the timing signal to send the input signal into pulse generator means 79. Pulse generator means 79 generates "1" only for the time X if the input signal is "1", which is output via OR gate 76. The pulse generation by pulse generator means 79 is halted after a predetermined number of bits are received, that is, after the elapse of the receiving time of data for one frame.

Although the pulse width corrections shown in FIGS. 18 to 26 have been described as being executed by second ECU 2, this function may be provided in all the other ECU's, or may be provided only in a preselected ECU or ECU's of the ECU's constituting the data transmission system.

Of the pulse width corrections, the embodiments shown in FIGS. 18 to 20 and FIGS. 21 to 23 are to control the pulse width by matching the timings of the rise and fall of a pulse with the original pulse sent by a particular ECU, and FIGS. 24 to 26 are to control the timings of the rise and fall of them, thereby for controlling the pulse width. In addition to such pulse width control, a function for adjusting the pulse height may be added to each ECU or, predetermined ECU or ECU's to perform the so-called 3R (timing, pulse width and peak value) correction.

AND gate 13 shown in FIGS. 1, 3, 10 and 15 to 17 may be any switching means whose opening and closing are controlled by a control signal to be supplied to, for instance, second input terminal 13B of the AND gate 13. OR gate 14 may also be any means that prevents data back flow from output terminals 1A to 4A.

Figure 27:
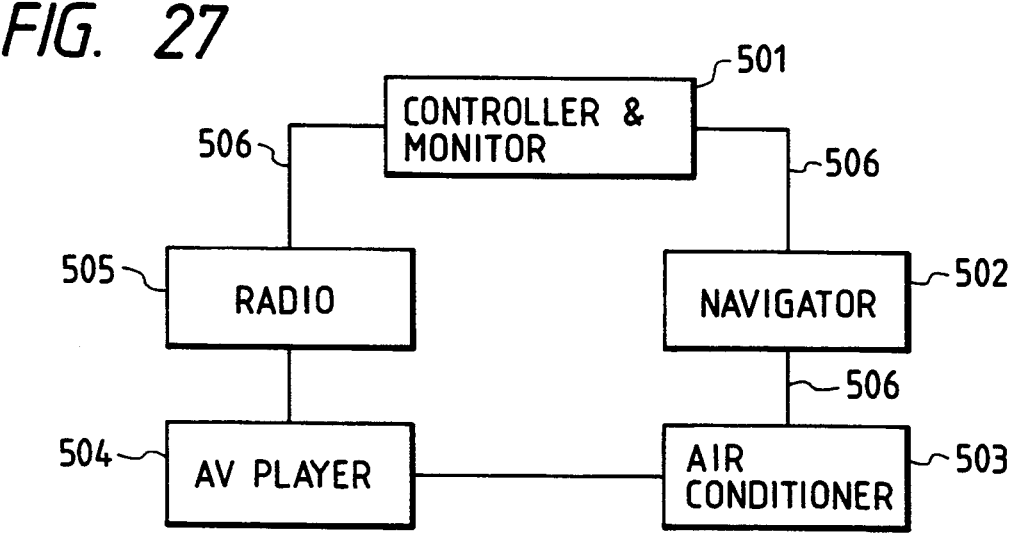
FIG. 27 is a block diagram showing an example of entertainment systems.

Although the above embodiments are applied to the control unit of vehicles, for instance, they may be utilized for accessory systems mounted on vehicles such as navigator, AV player and telephone as shown in FIG. 27, or in the field of home electronics. In FIG. 27, symbol 501 is controller and monitor, and symbols 502 to 506 are navigator, air conditioner, AV player, radio (tuner and amplifier) and optical fiber, respectively.

In accordance with the data transmission system of the present invention, the following advantages are expected.

(1) Data communication can be performed at high speed with a relatively simple configuration and without using a technique such as LAN, and if the data received in data receiving means of a local data processing unit are not those sent from the local data processing unit itself, the received data are resent from the data sending means, whereby data collision is avoided.

(2) By detecting information on the data sending data processing unit included in transmitted data, it can be determined whether or not the received data are the data which were sent from the particular station (local station), so that this judgment can simply be made.

(3) Since the check bit is inverted when the received data are resent, it is possible to determine whether or not the data successfully passed through the respective data processing units when the data have returned to the station which originally sent the data.

(4) The constructions of the data sending means and data receiving means become simple, and in data sending, accurate data transmission synchronizing with the clock pulse or the like input to the register can be performed.

What is claimed is:

1. A data transmission system comprising a plurality of data processing units having data input and output terminals, and optical fibers for connecting the output terminal of a preceding data processing data processing unit with the input terminal of a succeeding data processing unit, said plurality of data processing units being interconnected in a daisy chain by connecting all the input and output terminals of each said data processing unit to the output and input terminals of the adjoining data processing units by the optical fibers, each data processing unit comprising:

optical/electrical converter means for converting optical signal data supplied from said preceding data processing unit through said optical fiber to electrical signal data, electrical/optical converter means for converting electrical signal data to be sent to said succeeding data processing unit to optical signal data, data receiving means for receiving the output of said optical/electrical converter means, and gate means connected between said optical/electrical converter means and electrical/optical converter means, said gate means being closed when said data transmission system performs data transmission therefrom, and being opened in an alternative data receive/pass mode, the data to be transmitted including a data length area, and at least one of said data processing units comprising means for adding data to the data transmitted from another data processing unit, and means for rewriting said data length area in the data transmitted from said other data processing unit when new data is multiplexed with the data transmitted from said other data processing unit.

2. A data transmission system as set forth in claim 1 wherein data to be sent are provided with a check bit area, and at least one of said data processing units further comprises:

check bit control means for inverting a bit in the check bit area of the data transmitted from another data processing unit when said data passes through the gate means and output terminal of said at least one data processing unit, judging means for determining whether or not the data received in said data receiving means were output from said data processing unit itself, and means for detecting the existence of bit inversion in the check bit area in the data received in said receiving means if said data were output from said data processing unit itself, and for retransmitting the already transmitted data if said bit inversion is not done.

3. A data transmission system as set forth in claim 2 wherein said check bit control means of a local data processing unit inverts a bit in the check bit area only if the data transmitted from another data processing unit are addressed to said local data processing unit, and the already transmitted data are re-transmitted again, if the data processing unit which is the destination of data transmission does not invert the bit in the check bit area.

4. A data transmission system as set forth in claim 2 wherein said data re-transmission is not performed more than a predetermined number of times.

5. A data transmission system as set forth in claim 1 wherein at least one of said data processing units comprises:

judging means for determining whether or not the data received by said data receiving means include the data which were output from said data processing unit itself, multiplexing detecting means for detecting whether or not said data received are multiplexed if the judgment result of said judging means is positive, and means for deleting the data output by said local data processing unit itself from the data received in said data receiving means, and rewriting and transmitting the data length in said received data, if the data are multiplexed.

6. A data transmission system as set forth in claim 5 including data transfer means for transferring the data received in said data receiving means to said data sending means if the judging result of said judging means is negative, said data sending means sending again the data received in said data receiving means if said data were transferred thereto.

7. A data transmission system as set forth in claim 6 wherein data to be transmitted between each data processing unit include sending data processing unit information on which data processing unit has sent tile data, and said judging means outputs said negative judgment when said data processing unit information in the data received in said data receiving means is not local data processing unit information.

8. A data transmission system as set forth in claim 1 wherein at least one of said data processing units further comprises pulse correcting means, which is connected between said gate means and said output terminal for correcting the waveform of pulses constituting data when said data pass through said gate means.

9. A data transmission system as set forth in claim 8 wherein said pulse correcting means corrects the width of the received pulses to their original pulse width.

10. A data transmission system as set forth in claim 9 wherein said pulse correcting means comprises signal outputting means for outputting a signal to said output terminal during a period from reception of the pulse to said data processing unit to the end of the pulse reception, and one of means for causing the signal output by said signal outputting means to continue for a predetermined time $\Delta X1$ since the end of said pulse reception, and pulse outputting means for outputting a signal to said output terminal for said predetermined time $\Delta X1$ since the end of said pulse reception.

11. A data transmission system as set forth in claim 9 wherein said pulse correcting means is signal outputting means, which, upon reception of the pulse to said data processing unit, outputs a pulse having the original pulse width X of said pulse to said output terminal.

12. A data transmission system as set forth in claim 8 wherein data to be transmitted are pulse data of an NRZ form which have a synchronizing pulse at the beginning thereof, and said pulse correcting means comprises:

first signal outputting means for outputting a signal to said output terminal at the beginning of reception of the synchronizing pulse to said data processing unit, and terminating said signal output after the elapse of a predetermined time $\alpha$ since the end of reception of said synchronizing pulse, timing signal generating means for generating a timing signal for each elapse of a predetermined time X corresponding to the pulse width for one bit and after the elapse of the predetermined time $\alpha$ since the end of reception of said synchronizing pulse, and second signal outputting means for outputting a signal to said output terminal at the generation of said timing signal according to the pulse reception in said data processing unit.

* * * * *